(12) United States Patent
Matoba

(10) Patent No.: US 8,531,700 B2
(45) Date of Patent: Sep. 10, 2013

(54) IMAGE FORMING APPARATUS, IMAGE FORMING METHOD AND MEDIUM FOR STORING AN IMAGE FORMING PROGRAM THEREOF WITH CHANGING OF OUTPUT SETTING DATA

(75) Inventor: Tatsuo Matoba, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1262 days.

(21) Appl. No.: 12/360,972

(22) Filed: Jan. 28, 2009

(65) Prior Publication Data

US 2009/0195821 A1 Aug. 6, 2009

(30) Foreign Application Priority Data

Feb. 5, 2008 (JP) ................................. 2008-025735

(51) Int. Cl.
*G06F 3/12* (2006.01)
(52) U.S. Cl.
USPC ........................... 358/1.15; 358/1.13; 358/1.1
(58) Field of Classification Search
USPC ........................................ 358/1.15, 1.13, 1.1
See application file for complete search history.

(56) References Cited

U.S. PATENT DOCUMENTS

| | | | | |
|---|---|---|---|---|
| 2004/0008355 A1* | 1/2004 | Usami | ............................. | 358/1.1 |
| 2006/0227373 A1* | 10/2006 | Matoba | ......................... | 358/1.15 |
| 2007/0171454 A1* | 7/2007 | Takahashi et al. | ........... | 358/1.14 |
| 2007/0229901 A1* | 10/2007 | Kusakabe | .................... | 358/1.18 |

FOREIGN PATENT DOCUMENTS

| | | |
|---|---|---|
| JP | 2002-063007 | 2/2002 |
| JP | 2006-139561 A | 6/2006 |
| JP | 2006-305760 | 11/2006 |
| JP | 2007-060126 | 3/2007 |

OTHER PUBLICATIONS

Akinori Takeo, Image Forming Apparatus and Image Forming Method, Mar. 8, 2007, JP 2007060126 A.*
Office Action dated Jun. 1, 2012, in Japanese Patent Application No. 2008-025735.

* cited by examiner

*Primary Examiner* — Benny Q Tieu
*Assistant Examiner* — Martin Mushambo
(74) *Attorney, Agent, or Firm* — Fitzpatrick, Cella, Harper & Scinto

(57) ABSTRACT

An image forming apparatus for storing document data for which output setting data is set comprises an acquisition unit configured to acquire device configuration information of the image forming apparatus and device configuration information of a print post-processing apparatus which is connected to the image forming apparatus and has a paper transport path not connected to the image forming apparatus; a change unit configured to change the output setting data of the stored document data using the device configuration information acquired by the acquisition unit; and a processing unit configured to process the document data using the output setting data changed by the change unit.

15 Claims, 16 Drawing Sheets

FIG. 6B

| Box | DOCUMENT NAME | INITIAL PRINT SETTINGS | UPDATABLE PRINT SETTINGS |
|---|---|---|---|
| 00 | 20070609 | 100 COPIES  PLAIN PAPER  A4<br>FULL COLOR  DOUBLE-SIDED PRINTING<br>CASE BINDING [MONOCHROME MFP]<br>607 — MANUAL PROCESS COUNT : 3 TIMES<br>608 — TOTAL OPERATION TIME : 20 MIN<br>609 — TOTAL COST : 10000.0 | 100 COPIES  PLAIN PAPER  A4  610<br>FULL COLOR  DOUBLE-SIDED PRINTING<br>CASE BINDING [COLOR MFP]<br>MANUAL PROCESS COUNT : 1 TIMES<br>TOTAL OPERATION TIME : 22 MIN  611<br>TOTAL COST : 11000.0 |
| 00 | 20070619 | 50 COPIES  PLAIN PAPER  A4<br>FULL COLOR  DOUBLE-SIDED PRINTING<br>DISCHARGE TO CASSETTE 3 [DISABLED]<br>MANUAL PROCESS COUNT : 3 TIMES<br>TOTAL OPERATION TIME : 15 MIN<br>TOTAL COST : 3000.0 | 50 COPIES  PLAIN PAPER  A4<br>FULL COLOR  DOUBLE-SIDED PRINTING<br>DISCHARGE TO DECK 1<br>MANUAL PROCESS COUNT : 1 TIMES<br>TOTAL OPERATION TIME : 15 MIN<br>TOTAL COST : 3000.0 |

TOTAL : 3 DOCUMENTS

DETAILED SETTINGS
SELECT SETTINGS
● USE INITIAL SETTINGS
○ UPDATE TO NEW SETTINGS
○ ADD NEW SETTINGS

DETAILED SETTINGS
SELECT SETTINGS
● USE INITIAL SETTINGS
○ UPDATE TO NEW SETTINGS
○ ADD NEW SETTINGS

DEVICE ID : mono-mfp1 —701
SETTING / UPDATING DATE / TIME : 2007/06/17 10:00:00 —702

DEVICE NAME : MONOCHROME MFP —703
PRINT FUNCTION : —704
  PRINT SPEED : 80ppm
  COLOR CLASSIFICATION : MONOCHROME
  FORMAT : JBIG, PDF, JPEG, TIFF
  PAPER SIZE : A3, B4, A4, A4R, B5, B5R, A5R, INDEFINITE (100*148.5 ~ 330*483)
  DOUBLE-SIDED PRINTING UNIT : AVAILABLE
  FEED :
      DECK 1 : A4 PLAIN PAPER, 10,000 SHEETS AT MAXIMUM [POD DECK]
      DECK 2 : A4R PLAIN PAPER, 10,000 SHEETS AT MAXIMUM [POD DECK]
      CASSETTE 3 : A3 PLAIN PAPER, 500 SHEETS AT MAXIMUM
      CASSETTE 4 : B4 PLAIN PAPER, 500 SHEETS AT MAXIMUM
      MANUAL FEED TRAY :
DISCHARGE :
      FINISHER : PLAIN PAPER, 500 SHEETS AT MAXIMUM [SADDLE FINISHER]
      DISCHARGE TRAY : PLAIN PAPER, 100 SHEETS AT MAXIMUM
      STACKER : PLAIN PAPER, 5,000 SHEETS AT MAXIMUM [STACKER]
  COST :
      8.0 / SHEET
  NEAR-LINE : AVAILABLE
POST-PROCESS FUNCTION : —705
  BOOKBINDING :
      SADDLE STITCH STAPLING: [SADDLE FINISHER]
        SPEED : 25ppm
        STAPLING ENABLED NUMBER OF SHEETS : PLAIN PAPER, 100 SHEETS AT MAXIMUM
        SADDLE STITCH STAPLING ENABLED NUMBER OF SHEETS : PLAIN PAPER, 20 SHEETS AT MAXIMUM
        COST : 30.0 / COPY
        NEAR-LINE : AVAILABLE
      CASE BINDING : [CASE BINDING APPARATUS]
        SPEED : 20ppm
        BINDING ENABLED NUMBER OF SHEETS : PLAIN PAPER, 100 SHEETS AT MAXIMUM
        COST : 200.0 / COPY
        NEAR-LINE: AVAILABLE
ATTACHED ACCESSORIES —706
  DEVICE ID : poddeck1
      DEVICE NAME : POD DECK
  DEVICE ID : stacker1
      DEVICE NAME : STACKER
  DEVICE ID : finisher1
      DEVICE NAME : SADDLE FINISHER
  DEVICE ID : perfectbinder1
      DEVICE NAME : CASE BINDING APPARATUS

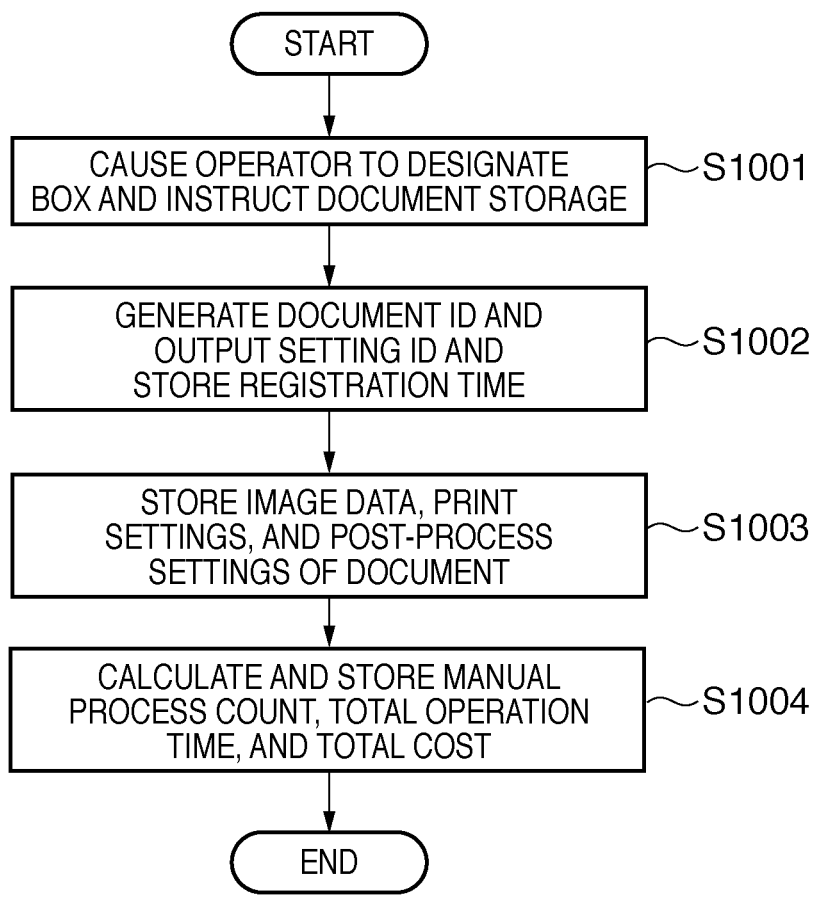

IMAGE FORMING APPARATUS, IMAGE FORMING METHOD AND MEDIUM FOR STORING AN IMAGE FORMING PROGRAM THEREOF WITH CHANGING OF OUTPUT SETTING DATA

BACKGROUND OF THE INVENTION

1. Field of the Invention

The present invention relates to an image forming apparatus for outputting image data based on output setting data, image forming method and medium storing an image forming program thereof.

2. Description of the Related Art

Recently, a market called "Print On Demand" (to be referred to as POD hereinafter) is widely spreading. In this market, digital printing using electronic data is implemented by making the most of a digital image forming apparatus such as a digital copying machine or a digital multifunction peripheral, and a finisher apparatus without using any large-scale apparatus or system. This makes it possible to handle jobs of relatively small lots and shorten the delivery time as compared to conventional large-scale printing presses and printing methods.

Digitized management and control using computers are more penetrating in the POD market than before. Under these circumstances, CRD (Centralized Reproduction Department), which is supposed to be an in-house print service, is also becoming popular in the POD market.

A print service of the POD or CRD often uses a plurality of, or a plurality of kinds of, image forming apparatuses. For example, Japanese Patent Laid-Open No. 2006-305760 describes a technique using a plurality of image forming apparatuses and finisher apparatuses. This technique makes it possible to handle a near-line finisher apparatus provided in at least one image forming apparatus connected to a network as an in-line finisher. Japanese Patent Laid-Open No. 2007-60126 describes a technique using a plurality of image forming apparatuses which share reusable job files without intervening a server to enable execution and reuse of the job files based on the device specifications.

In the POD or CRD, an image forming apparatus or a finisher is often added or replaced, as needed, to provide a print service. Japanese Patent Laid-Open No. 2002-63007 describes a technique of coping with a change in print environment. This technique provides a print environment information change notification system, in which if the print environment of a printer designated on a terminal has changed, the change information is displayed on the spot.

In general, an image forming apparatus has a function called "box" which stores, in a storage area, document data that has undergone print settings and RIP (Raster Image Processor) processing and uses the stored document data for high-speed reprinting. It is now common practice in the POD or CRD to store, in such a box, a document which will be printed repeatedly at a high probability, thereby preparing for reprinting.

In the conventional technique, when a document is stored in a box of the image forming apparatus for the purpose of reprinting, and the device configuration is then updated, print settings upon document storage can be reproduced in the new device configuration. However, the print settings at the time of document storage do not assume the new device configuration. It is therefore impossible to output the data by effectively using the latest device. More specifically, in the prior art, if the user acquires the latest device configuration and selects new print settings different from the initial print settings, the box document can be output effectively. However, it is difficult to automatically cope with the latest device configuration. Note that a document stored in a box will sometimes be referred to as a box document in the present invention.

Document output is effective when, for example, the operator's manual process count until a printing result is obtained decreases, the total operation time until a printing result is obtained shortens, or the total cost until a printing result is obtained decreases. Assume that print settings upon storing a box document include bookbinding using a near-line finisher. If an in-line bookbinding apparatus is newly connected after box document storage, more effective bookbinding can be done using the new in-line bookbinding apparatus because the operator need not transport printed products between the devices.

Assume that print settings upon storing a box document include bookbinding using a bookbinding apparatus after printing. If a new high-speed bookbinding apparatus is additionally introduced after box document storage, more effective bookbinding can be done using the new bookbinding apparatus because the total operation time can be shorter.

Assume that print settings upon storing a box document include discharge to a finisher. If a new stacker is additionally introduced after box document storage, and an enormous number of copies of the document are to be made, a more effective operation can be performed by discharging paper to the new stacker because it saves the operator taking printed products out of the finisher many times.

Assume that print settings upon storing a box document include manual paper feed. If a new paper feed cassette is additionally introduced after box document storage, and paper sheets to be used for the box document are stored in the new paper feed cassette, more effective paper feed can be done using the new paper feed cassette because it saves the operator paper feed operation.

Assume that print settings upon storing a box document include printing using a color image forming apparatus although the document data is a monochrome image. If a new monochrome image forming apparatus is additionally introduced after box document storage, the box document can be printed more effectively using the new monochrome image forming apparatus because the print unit cost of the monochrome apparatus is lower than that of a color apparatus.

Conventionally, to acquire the latest device configuration and make effective print settings as described above at the time of box document storage, the operator needs to grasp the print settings of the box document and the latest device configuration and manually change the print settings of the target box document. The technique of Japanese Patent Laid-Open No. 2002-63007 allows the operator to acquire the latest print environment of a designated printer when printing a document. However, it is impossible to acquire the latest print environment including the information of devices other than the designated printer, automatically make effective print settings, and present them to the operator. To use effective print settings based on the latest device configuration when printing a document, the operator must grasp the latest device configuration and then manually change the print settings of the document. To do this, expert knowledge, and time and labor for the operation are necessary.

SUMMARY OF THE INVENTION

The present invention provides an image forming apparatus capable of automatically changing output settings upon document storage to more effective output settings using a latest device configuration when printing a document.

The present invention in its first aspect provides an image forming apparatus for storing document data for which output setting data is set, comprising an acquisition unit configured to acquire device configuration information of the image forming apparatus and device configuration information of a device connected to the image forming apparatus, a change unit configured to change the output setting data using the device configuration information acquired by the acquisition unit, and a processing unit configured to process the document data using the output setting data changed by the change unit.

The present invention in its second aspect provides an image forming method executed in an image forming apparatus for storing document data for which output setting data is set, comprising the steps of: acquiring device configuration information of the image forming apparatus and device configuration information of a print post-processing apparatus which is connected to the image forming apparatus and has a paper transport path not connected to the image forming apparatus; changing the output setting data of the stored document data using the device configuration information acquired in the acquiring step; and processing the document data using the output setting data changed in the changing step.

The present invention in its third aspect provides a computer-readable storage medium which stores an image forming program to store document data for which output setting data is set, the program causing a computer serving as an image forming apparatus to function to: acquire device configuration information of the image forming apparatus and device configuration information of a print post-processing apparatus which is connected to the image forming apparatus and has a paper transport path not connected to the image forming apparatus; change the output setting data of the stored document data using the acquired device configuration information; and process the document data using the changed output setting data.

The image forming apparatus can automatically change output settings upon document storage to more effective output settings using a latest device configuration when printing a document.

Further features of the present invention will become apparent from the following description of exemplary embodiments with reference to the attached drawings.

BRIEF DESCRIPTION OF THE DRAWINGS

FIGS. 6A and 6B are views showing an example of a restoration window;

FIG. 7 is a view showing an example of a device configuration information table;

FIG. 10 is a flowchart illustrating a procedure of newly registering a document in a box of the color MFP;

DESCRIPTION OF THE EMBODIMENTS

Figure 1:
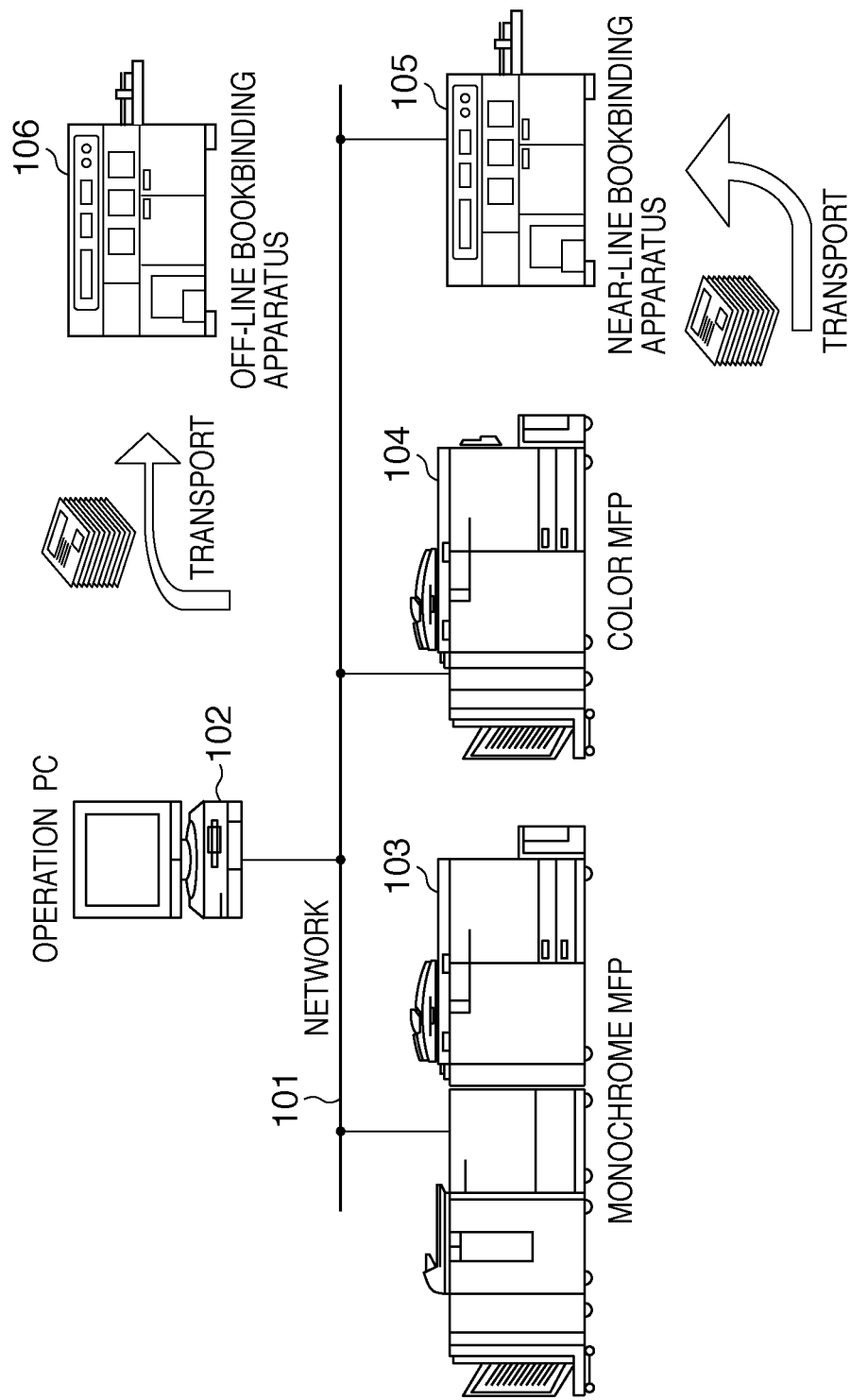
FIG. 1 is a view showing the overall arrangement of an image forming system including an image forming apparatus according to a typical embodiment of the present invention.

The best mode for carrying out the present invention will now be described in detail with reference to the accompanying drawings. The same reference numerals denote the same constituent elements, and a repetitive description thereof will be omitted.

<<System Arrangement>>

FIG. 1 is a view showing the overall arrangement of an image forming system including an image forming apparatus according to a typical embodiment of the present invention. As shown in FIG. 1, an operation PC 102, a monochrome MFP (Multi Function Peripheral) 103 functioning as an image forming apparatus, a color MFP 104 functioning as another image forming apparatus, and a near-line bookbinding apparatus 105 functioning as a near-line finisher are connected via a network 101. The arrangement also includes an off-line bookbinding apparatus 106 serving as an off-line finisher which is not connected to the network 101.

The operation PC 102 is a general information processing apparatus (computer) including a CPU, ROM, RAM, and HDD and having a network connection means. The operation PC 102 instructs editing and printing of input application files and also performs management of the monochrome MFP 103 and the color MFP 104 (including backup and restoration of box documents) via an Internet browsing means. The operation PC 102 stores box documents which are backed up. The operation PC 102 can also store documents for reprinting.

Each of the monochrome MFP 103 and the color MFP 104 serving as image forming apparatuses is an MFP having various functions such as scan, print, copy, and box. The monochrome MFP and the color MFP are selectively used in accordance with the application purpose because the speed, cost, and the like are different. Various optional devices for post-processes are in-line-connected to the monochrome MFP 103 and the color MFP 104. Examples of the optional devices are a case binding apparatus for binding a book, a stacker for storing an enormous number of discharged paper sheets, and a paper deck for storing an enormous number of paper sheets to be fed.

The near-line bookbinding apparatus 105 executes a bookbinding process of printing paper sheets output from the monochrome MFP 103 or the color MFP 104. The operator transports printing paper sheets output from the monochrome MFP 103 or the color MFP 104 and sets them on the paper feed port of the near-line bookbinding apparatus 105. The device is controlled in accordance with an operation instruction sent from the operation PC 102, monochrome MFP 103, or color MFP 104 via the network 101 so that a finishing process is executed.

The off-line bookbinding apparatus 106 executes a bookbinding process of printing paper sheets output from the monochrome MFP 103 or the color MFP 104. Since the off-line bookbinding apparatus 106 is not connected to the network 101, the device is controlled by an operator's manual operation. The operator transports printing paper sheets output from the monochrome MFP 103 or the color MFP 104 and sets them on the paper feed port of the off-line bookbinding apparatus 106. Then, the operator sets a post-process via the operation unit of the off-line bookbinding apparatus 106 so that a finishing process is executed. The near-line bookbinding apparatus 105 and the off-line bookbinding apparatus 106 have been described above as bookbinding apparatuses. However, a device of any other type may be used if it executes a post-process.

Referring to FIG. 1, the operation PC 102, monochrome MFP 103, color MFP 104, near-line bookbinding apparatus 105, and off-line bookbinding apparatus 106 are single devices. However, a plurality of devices may be connected. In-line, near-line, and off-line will be described here.

1) In-line finisher: a post-processing apparatus having a paper path physically connected to an MFP. An operation instruction or status confirmation information is also electrically transmitted/received to/from the MFP.
2) Near-line finisher: a post-processing apparatus whose paper path is not connected to an MFP. An operator transports an output product, although an operation instruction or status confirmation information can electrically be transmitted/received via a communication means such as a network.
3) Off-line finisher: a post-processing apparatus whose paper path and communication means for an operation instruction or status confirmation information are not connected to an MFP at all. An operator transports an output product, sets it, manually inputs an operation, and visually confirms a status report issued from the device itself.

<<Hardware Configuration of Image Forming Apparatus>>

Figure 2:
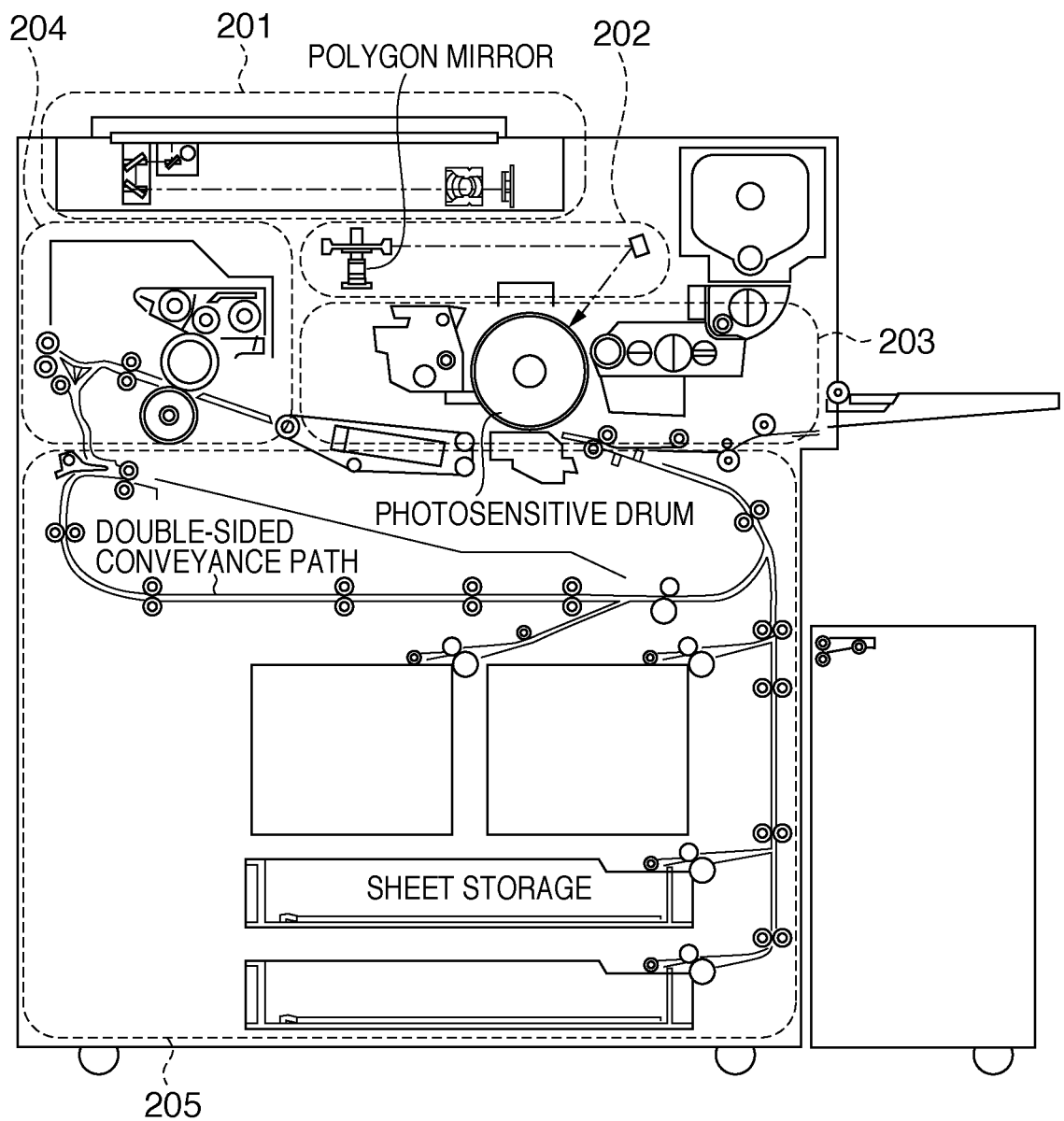
FIG. 2 is a sectional view showing the internal structure of a color MFP which functions as the image forming apparatus according to the embodiment.

FIG. 2 is a sectional view showing the internal structure of the color MFP 104 which functions as the image forming apparatus according to the embodiment. MFPs are classified into full-color devices and monochrome devices. A full-color device often includes the arrangement of a monochrome device, concerning basic portions except for color processing and internal data. Hence, a full-color device will mainly be explained below.

The color MFP 104 which is a 1D color MFP includes a scanner unit 201, laser exposure unit 202, photosensitive drum, image forming unit 203, fixing unit 204, paper feed/conveyance unit 205, and control unit 300 (to be described later) for controlling them.

The scanner unit 201 optically reads the image of an original placed on an original table and illuminated, and converts the image into an electrical signal to create image data. The laser exposure unit 202 inputs a light beam such as a laser beam modulated in accordance with the image data to a polygon mirror which rotates at a uniform angular velocity so that the reflected scanning light irradiates the photosensitive drum. The image forming unit 203 rotationally drives the photosensitive drum, causes a charger to charge it, and develops, using toner, a latent image formed on the photosensitive drum by the laser exposure unit. The toner image is transferred to a sheet, and micro toner which remains on the photosensitive drum without being transferred is collected. The series of electrophotographic processes is executed, thereby forming an image. While the sheet wound at a predetermined position of a transfer belt revolves four times, developing units (developing stations) having four kinds of toners repeatedly execute the above-described electrophotographic processes in turn. The four kinds of toners are magenta (M), cyan (C), yellow (Y), and black (K) toners. After four revolutions, the sheet having a full-color toner image of four colors is separated from the transfer drum and conveyed to the fixing unit 204.

The fixing unit 204 is formed by combining rollers and belts. The fixing unit 204 incorporates a heat source such as a halogen heater so that the toners on the sheet on which the toner image is transferred by the image forming unit 203 are melted and fixed by heat and pressure. The paper feed/conveyance unit 205 includes a sheet storage represented by a sheet cassette or a paper deck. In accordance with an instruction from the control unit 300, the paper feed/conveyance unit 205 separates one of a plurality of sheets stored in the sheet storage and conveys it to the image forming unit 203 and the fixing unit 204. The sheet is wound around the transfer drum of the image forming unit 203, revolved four times, and conveyed to the fixing unit 204. During the four revolutions, the above-described YMCK toner images are transferred onto the sheet. To form images on both sides of a sheet, control is performed to cause the sheet which has passed through the fixing unit 204 to move along the conveyance path toward the image forming unit 203 again. The control unit 300 controls the overall color MFP 104 and also instructs to smoothly operate the entire apparatus in synchronism while managing the states of the above-described scanner, laser exposure, image forming, fixing, and paper feed/conveyance units.

The system arrangement can include a plurality of image forming apparatuses or can be formed by combining a plurality of image forming apparatuses. A single-function image forming apparatus such as an SFP (Single Function Peripheral) having only a print function may be combined with the image forming apparatus. An information processing apparatus (computer) may also be combined.

<<Functional Block Arrangement of Image Forming Apparatus>>

Figure 3:
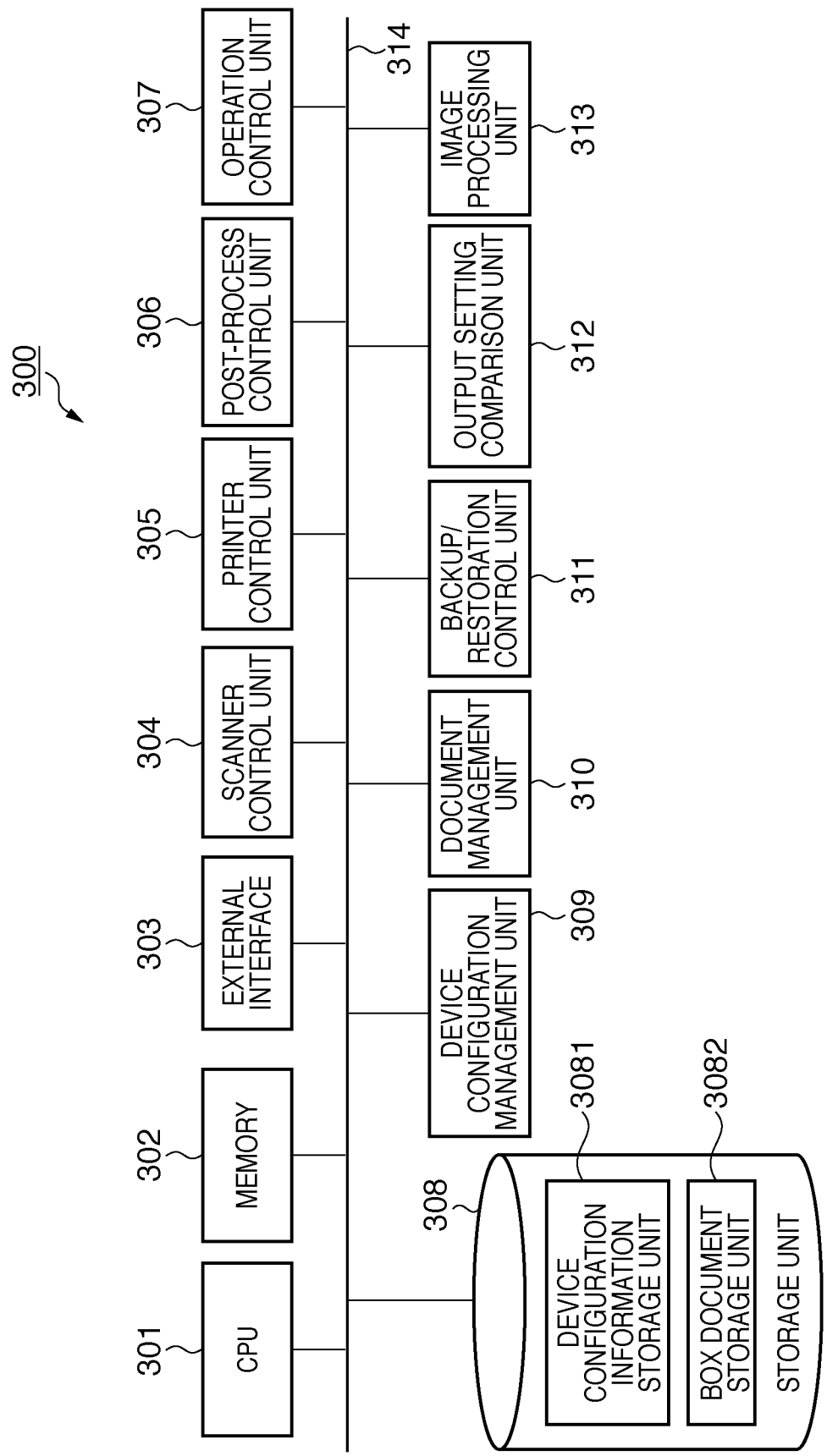
FIG. 3 is a block diagram showing the arrangement of a control unit in the color MFP or monochrome MFP serving as the image forming apparatus in FIG. 2.

FIG. 3 is a block diagram showing the arrangement of the control unit 300 in the color MFP 104 or monochrome MFP 103 serving as the image forming apparatus in FIG. 2. As shown in FIG. 3, the control unit includes a plurality of process modules. These process modules operate as an application program or a part of a program used by a CPU 301. A storage unit 308 shown in FIG. 3 is an information storage device in the file system or database system and includes a nonvolatile hard disk or memory. A specific key or condition enables access to information stored in the storage unit 308.

The CPU 301 controls the overall monochrome MFP 103 or color MFP 104 and reads out and executes programs stored in a memory 302 or the storage unit 308. The CPU 301 also outputs instructions to the respective units to implement operations such as scan, print, facsimile, and backup/restoration. The memory 302 is, for example, a ROM which stores various kinds of programs to be executed by the CPU 301, or a RAM which temporarily stores data necessary for control. In the various kinds of programs, a scanner control unit 304, printer control unit 305, post-process control unit 306, operation control unit 307, device configuration management unit 309, document management unit 310, backup/restoration control unit 311, output setting comparison unit 312, image processing unit 313, and the like operate. An external interface 303 transmits/receives information to/from the external operation PC 102, monochrome MFP 103, color MFP 104, and near-line bookbinding apparatus 105 via the network 101 or a detachable external storage device (not shown). The scanner control unit 304 drives the scanner unit 201, reads an original on the original table, and stores the read original image in the memory 302 in accordance with an instruction from the CPU 301. The printer control unit 305 acquires image data from the memory 302 or a box document storage unit 3082 included in the storage unit 308 in accordance with an instruction from the CPU 301. The printer control unit 305 also controls the printer unit including the laser exposure unit 202, image forming unit 203, fixing unit 204, and paper feed/conveyance unit 205 and prints an image on a printing paper sheet. The post-process control unit 306 controls, in accordance with an instruction from the CPU 301, a post-process unit which conveys a printing paper sheet printed by the printer unit in cooperation with the printer control unit 305 to an in-line-connected post-processing apparatus and performs a finishing process such as printing paper sheet sorting or bookbinding. The operation control unit 307 controls an operation unit 400 provided on the monochrome MFP 103 or the color MFP 104 and including a touch panel unit 401 and a key input unit 402 in accordance with an instruction from the CPU 301. When the operator operates these units, information is transmitted to the respective units, and the monochrome MFP 103 or the color MFP 104 can operate. The operation unit 400 will be described later.

The device configuration information of, for example, a post-process unit attached to the monochrome MFP 103 or the color MFP 104, and its updating log are registered in a device configuration information storage unit 3081 included in the storage unit 308. Device configuration information includes device information such as the processable amount, speed, and process unit cost of each device, and updating date/time information representing the updating date/time of the device information. The device configuration of another monochrome MFP 103, color MFP 104, or near-line bookbinding apparatus 105 connected via the network 101 may be registered in the device configuration information. Information such as the device configuration of the off-line bookbinding apparatus 106 or the unit cost per time of the operator who operates each device may also be registered. In this embodiment, the device configuration information storage unit 3081 is formed in the storage unit 308 in the control unit 300 of the monochrome MFP 103 or the color MFP 104. Instead, the device configuration information storage unit 3081 may be formed in a storage unit in the operation PC 102 connected via the network 101. Data registered in the device configuration information storage unit 3081 will be described later.

The box document storage unit 3082 stores box document information which is document data generated by associating image data, print settings, and post-process settings with each other. A box document contains image data input from the scanner control unit 304 or the operation PC 102 via the network 101, print settings to be used to output the image data, post-process setting information, and registration date/time information representing the registration date/time of the box document. In this embodiment, the box document storage unit 3082 is formed in the storage unit 308 in the control unit 300 of the monochrome MFP 103 or the color MFP 104. Instead, the box document storage unit 3082 may be formed in a storage unit in the operation PC 102 connected via the network 101. Data registered in the box document storage unit 3082 will be described later.

The device configuration management unit 309 manages the device configuration information registered in the device configuration information storage unit 3081 by, for example, registration, updating, and extraction in accordance with an instruction from the CPU 301. Registration and updating in the device configuration information storage unit 3081 are done either automatically when the device configuration management unit 309 detects a change in the device configuration or in accordance with an operator instruction via the operation unit 400 controlled by the operation control unit 307. The document management unit 310 manages the box document information registered in the box document storage unit 3082 by, for example, registration, updating, and extraction in accordance with an instruction from the CPU 301. The document management unit 310 associates original image data read by the scanner control unit 304 and stored in the memory 302 with print settings or post-process settings in each box document registered or updated in the box document storage unit 3082. The operator can give an instruction to display a box document list, document selection, and document output by operating the operation unit 400. At this time, the document management unit 310 extracts corresponding data from the box document storage unit 3082, displays the document information via the operation unit 400 controlled by the operation control unit 307, and instructs the printer control unit 305 to print it.

The backup/restoration control unit 311 backs up, to an external storage device, each box document stored in the box document storage unit 3082 in cooperation with the document management unit 310 in accordance with an instruction from the CPU 301. The backup/restoration control unit 311 also restores (reconstructs) the backed-up data from the external storage device to the box document storage unit 3082 in cooperation with the document management unit 310. The backup/restoration execution instruction from the operator is transmitted as an instruction from the operation unit 400 via the operation control unit 307. As a result, data is transferred between the box document storage unit 3082 and the external storage device connected to the external interface 303. In some cases, an instruction the operator has input by operating the operation PC 102 is transmitted from the network 101 via the external interface 303 so that data is transferred between the box document storage unit 3082 and the storage device of the operation PC 102.

When printing or restoring a box document, the output setting comparison unit 312 acquires latest device configuration information and compares print setting information and post-process setting information upon registering a box document with other print setting information and post-process setting information to obtain the same result. First, the document management unit 310 acquires the registration date/time of target box document data registered in the box document storage unit 3082 at the time of box document registration.

Next, the device configuration management unit 309 compares the updating dates/times of the respective devices stored in the device configuration information storage unit 3081 and acquires device configuration information at the time of box document registration. The device configuration management unit 309 then compares the device configuration information upon registering a box document with current device configuration information and acquires the change points of the device configuration information. The output setting comparison unit 312 searches for other new print settings and post-process settings using the latest device configuration information to obtain an output result based on the print setting information and post-process setting information set in the box document data. Subsequently, the output setting comparison unit 312 performs a comparison and determines whether the new print settings and post-process settings can decrease the operator's manual process count, the total operation time until an output result is obtained, or the total cost until an output result is obtained when outputting the target box document. The initial print setting information and post-process setting information and the new print setting information and post-process setting information of the target box document are displayed, for the operator, on the screen via the operation unit 400 controlled by the operation control unit 307. An example of a display screen for print setting information and post-process setting information when printing a box document will be described later. An example of a display screen for print setting information and post-process setting information when restoring a box document will be described later.

The image processing unit 313 performs image processing or processing of obtaining higher image quality instructed from the operator via the operation control unit 307, or analyzes image data stored in the memory 302 by the scanner control unit 304 in accordance with an instruction from the CPU 301. The image processing unit 313 also converts the resolution or paper size of image data to be transmitted in accordance with the capability of the transmission destination at the time of facsimile sending. The image processing unit 313 can also partially change the image data of a box document in accordance with an instruction from the output setting comparison unit 312 to enable off-line processing of the image data. For example, if the near-line bookbinding apparatus 105 connected via the network 101 is removed after box document registration, the image processing unit 313 partially changes initial image data so that the off-line bookbinding apparatus 106 can bind printed paper sheets into a book. More specifically, if the initial paper size is "A4", it is changed to "A4 plus" larger by one step, and register mark data are added to the initial image data, thereby generating data that allows the off-line post-process. An internal bus 314 connects the above-described units so that image data transfer and transmission/reception of instructions and set values for the respective units are done via the internal bus 314.

<<Operation Unit>>

Figure 4:
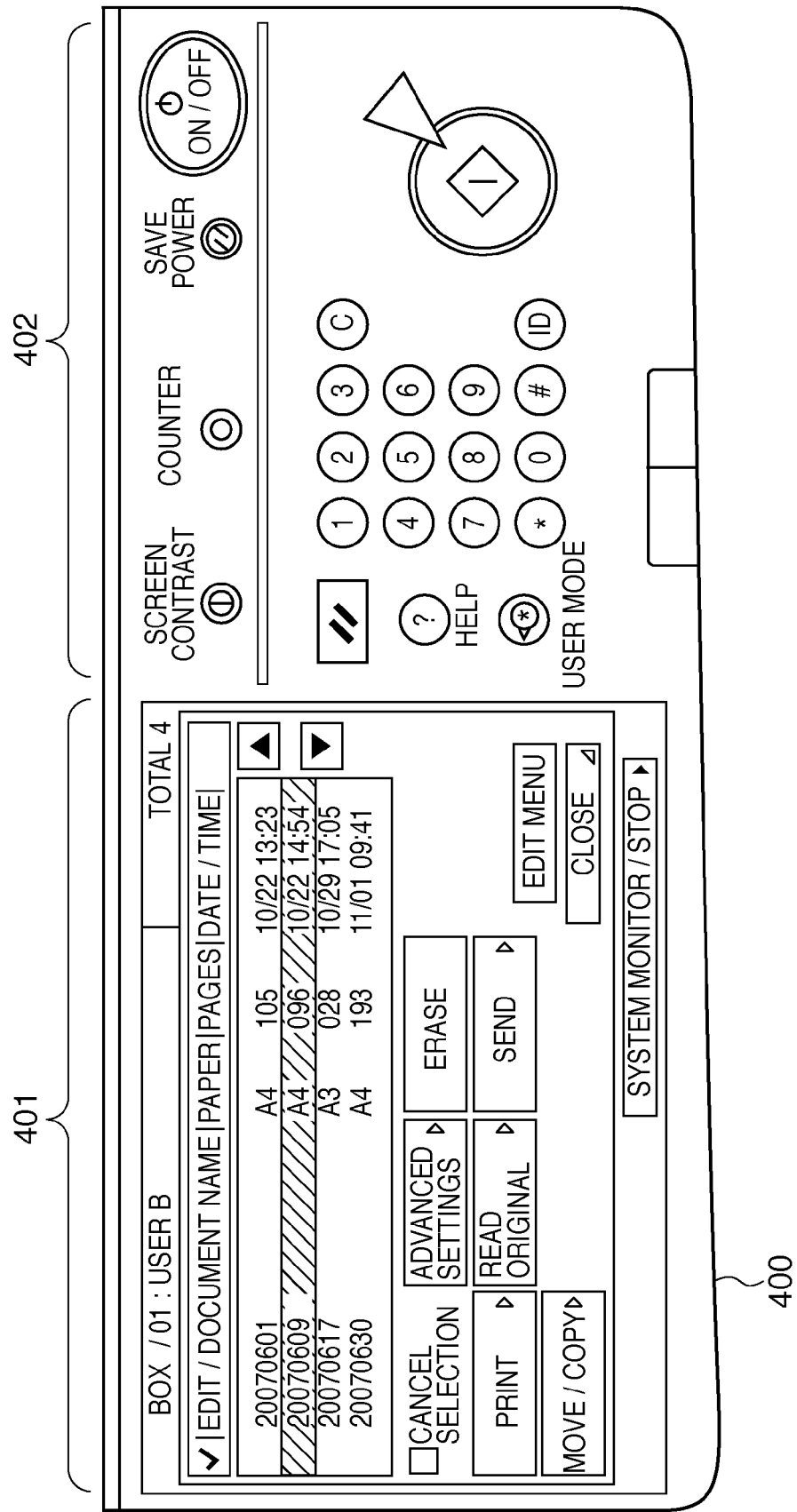
FIG. 4 is a view showing an example of an operation unit provided on the monochrome MFP or color MFP.

FIG. 4 is a view showing an example of the operation unit 400 provided on the monochrome MFP 103 or the color MFP 104 and operated by the operator. The operation unit 400 includes the touch panel unit 401 and the key input unit 402. The touch panel unit 401 is formed from a touch panel display including an LCD (Liquid Crystal Display) and a transparent electrode bonded thereon. For example, when an operator's finger touches the transparent electrode corresponding to a key displayed on the LCD, the touch panel unit 401 can detect it and display another operation window. FIG. 4 shows an example of a box window. The key input unit 402 allows steady operation settings. The key input unit 402 includes an operation unit power switch to switch between a standby mode and a sleep mode, a start key to give the instruction for the start of, for example, copy or sending, a ten-key pad to make various kinds of settings, and a reset key to disable various kinds of settings.

<<Print Setting Update Confirmation Window>>

Figure 5:
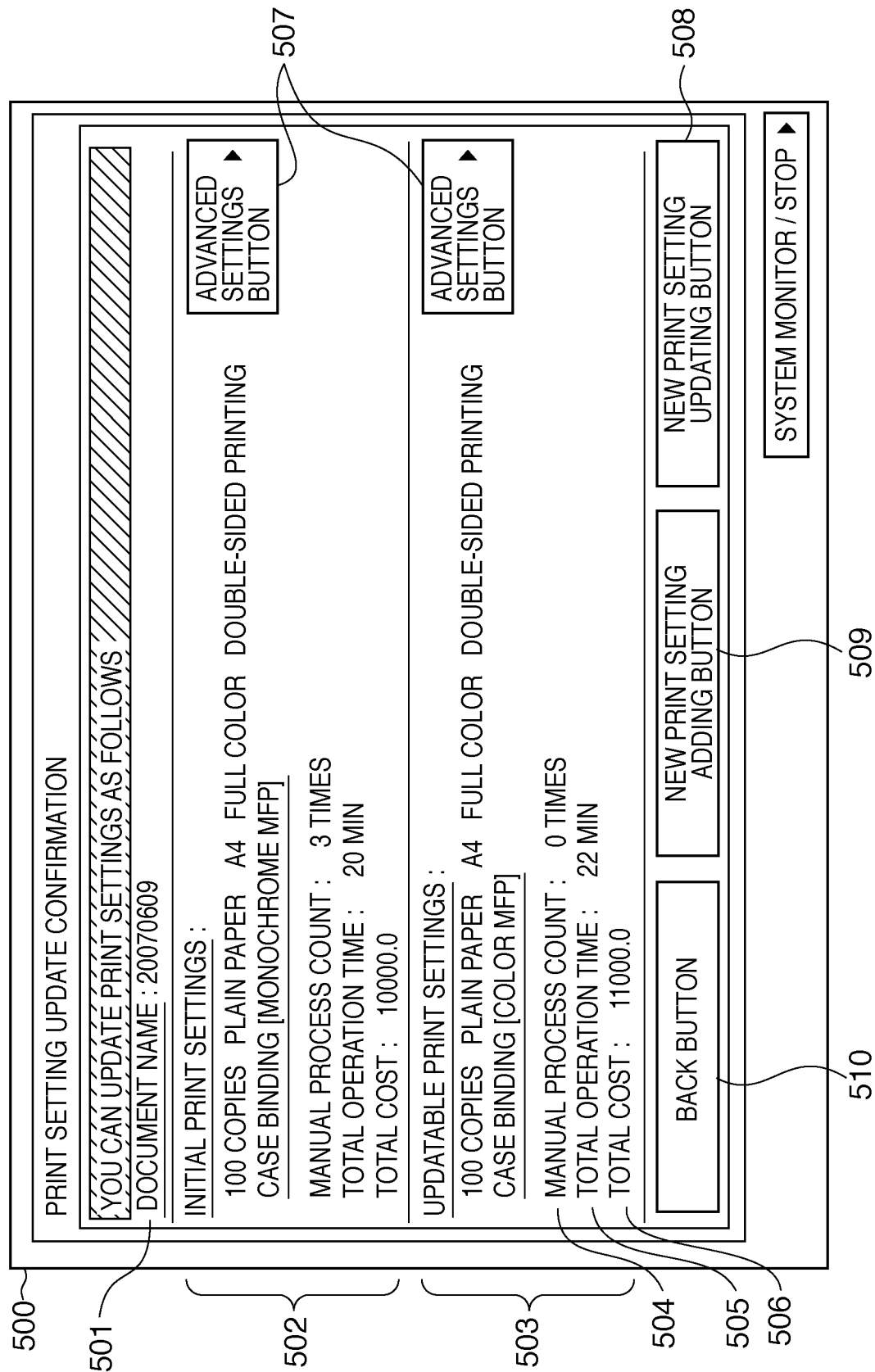
FIG. 5 is a view showing an example of a print setting update confirmation window.

FIG. 5 is a view showing an example of a print setting update confirmation window 500 which displays, on the touch panel unit 401, print setting information and post-process setting information upon registering a target document in a box, and other print settings and post-process settings to obtain the same result.

The print setting update confirmation window 500 is displayed when the operator operates the operation unit 400 of the color MFP 104 to print a box document. The output setting comparison unit 312 acquires other print settings and post-process settings to obtain the same result as that based on the print setting information and post-process setting information upon registering the target document, thereby generating items to be displayed on the print setting update confirmation window 500.

A document name 501 represents the display name of the operation target document. Initial print settings 502 represent print setting information and post-process setting information upon registering the target document. Updatable print settings 503 represent other print settings and post-process settings to obtain the same result as that based on the print setting information and post-process setting information upon registering the document. Setting information changeable in the initial print settings 502 and the updatable print settings 503 is displayed as, for example, an underlined item such that the operator can recognize it. As shown in FIG. 5, "case binding" should be executed by the "monochrome MFP" in the initial print settings 502. In the updatable print settings 503, however, "case binding" should be executed by the "color MFP", as can be identified by an underline. If a parameter usable in the initial print settings 502 is unusable in the updatable print settings 503, the item is defined as, for example, "disabled" so that the operator can discriminate it.

A manual process count 504 is displayed in both the initial print settings 502 and the updatable print settings 503. The number of times of operator's manual processes necessary for output based on each print setting information is calculated and displayed. More specifically, when the color MFP 104 should execute printing, and the monochrome MFP 103 should execute bookbinding, the required number of times of printing paper sheet transport or the like is displayed. Alternatively, the number of times of acquisition of printing paper sheets discharged from the color MFP 104 is displayed. The number of times of paper feed to the feeding source in printing by the color MFP 104 may be displayed.

A total operation time 505 is displayed in both the initial print settings 502 and the updatable print settings 503. The total operation time necessary for output based on each print setting information is calculated on the basis of the process speed of the device and the number of printing paper sheets and displayed. More specifically, when the color MFP 104 should execute printing, and the near-line bookbinding apparatus 105 should execute bookbinding, the times required by the devices are calculated, added, and displayed.

A total cost 506 is displayed in both the initial print settings 502 and the updatable print settings 503. The total cost necessary for output based on each print setting information is calculated on the basis of the counter unit cost of the device and the number of printing paper sheets and displayed. More specifically, the counter cost of the color MFP 104 for printing and that of the monochrome MFP 103 for transfer and printing are calculated and displayed.

An advanced settings button 507 is provided for both the initial print settings 502 and the updatable print settings 503 to display the advanced setting information of the print settings. When the advanced settings button 507 is pressed, an advanced print settings dialogue (not shown) is displayed. A new print setting updating button 508 updates and registers the print settings of the box document represented by the document name 501 as the print settings displayed in the updatable print settings 503. When the operator presses this button, the document management unit 310 updates the print settings and post-process settings of the corresponding document in the box document storage unit 3082 to the updatable print settings. A new print setting adding button 509 is used to additionally register the print settings displayed in the updatable print settings 503 as the print settings of the box document represented by the document name 501. When the operator presses this button, the document management unit 310 adds the updatable print settings to the print settings and post-process settings of the corresponding document in the box document storage unit 3082. The operator presses a back button 510 to maintain the initial print settings without updating the print settings of the corresponding box document.

When the operator presses the new print setting updating button 508, new print setting adding button 509, or back button 510, the print setting update confirmation window 500 is closed, and the invocation source window is displayed again.

<<Restoration Window>>

Figure 6A:
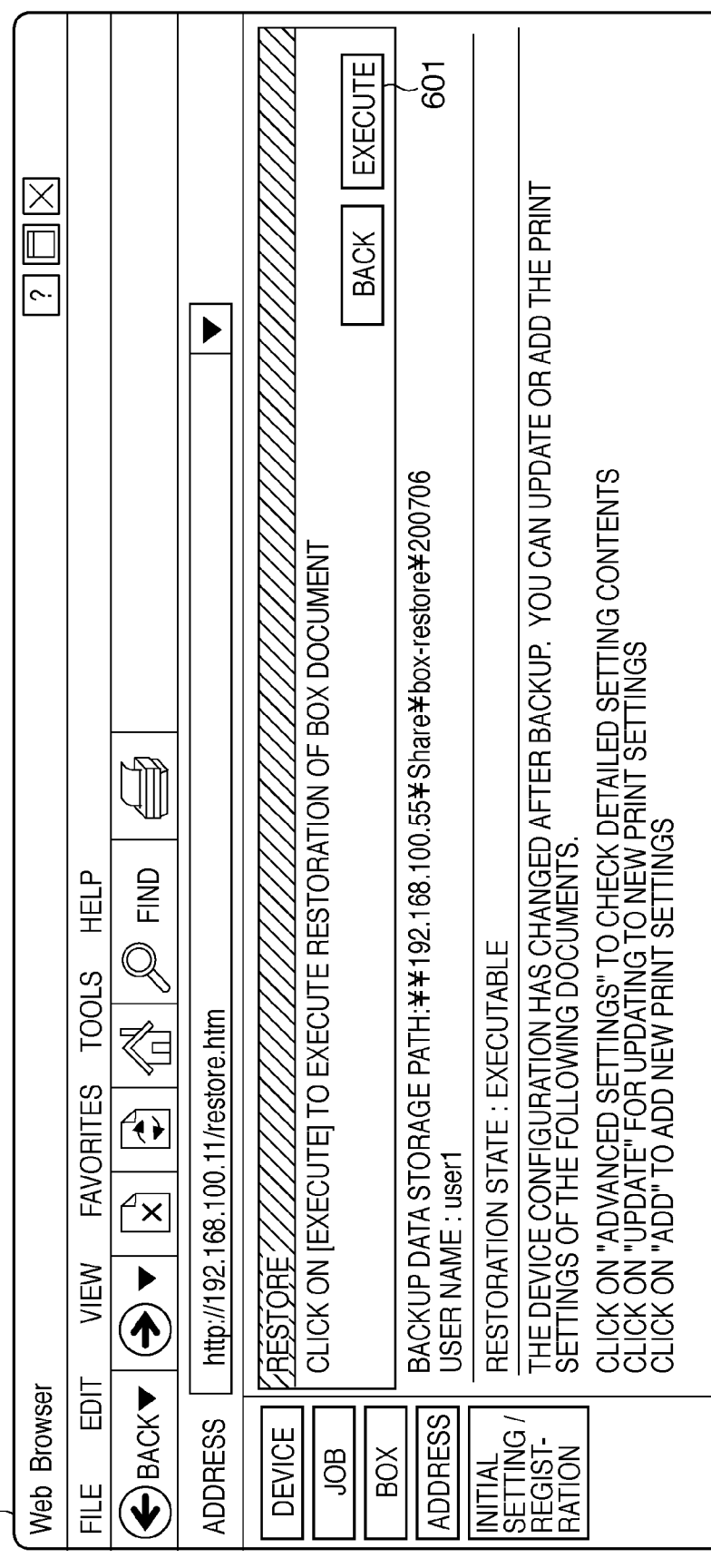

FIGS. 6A and 6B are views showing an example of a restoration window 600 which displays initial print settings upon registering a document to be restored in a box of the color MFP 104 and other updatable print settings to obtain the same result as that based on the initial print settings.

The restoration window 600 is displayed when the operator operates a Web browser on the operation PC 102, which is connected to the color MFP 104 via the network 101, to restore a backed-up box document. Items to be displayed on the restoration window 600 are generated when the output setting comparison unit 312 acquires other print settings and post-process settings to obtain the same result as that based on the print setting information and post-process setting information upon backing up the restoration target document.

A restoration execution button 601 is used to execute restoration to the restoration destination (a box of the color MFP 104 in this case) of the backup data of a designated box document. An update candidate list 602 is a list of documents which are extracted from a plurality of backed-up documents and have obtained, upon changing the device information upon registering the documents, other effective print settings and post-process settings to obtain the same result as that based on the print setting information and post-process setting information. A box number 603 displays the number of each box as the restoration destination of the restoration target document. A document name 604 represents the display name of the restoration target document. Initial print settings 605 represent print setting information and post-process setting information upon registering the restoration target document. Updatable print settings 606 represent other print settings and post-process settings to obtain the same result as that based on the print setting information and post-process setting information upon registering the document. Setting information changeable in the initial print settings 605 and the updatable print settings 606 is displayed as, for example, an underlined item such that the operator can recognize it. As shown in FIGS. 6A and 6B, "case binding" should be executed by the "monochrome MFP" in the initial print settings 605. In the updatable print settings 606, however, "case binding" should be executed by the "color MFP", as can be identified by an underline. If a parameter usable in the initial print settings 605 is unusable in the updatable print settings 606, the item is defined as, for example, "disabled" so that the operator can discriminate it.

A manual process count 607 is displayed in both the initial print settings 605 and the updatable print settings 606. The number of times of operator's manual processes necessary for output based on each print setting information is calculated and displayed. More specifically, when the color MFP 104 should execute printing, and the monochrome MFP 103 should execute bookbinding, the required number of times of printing paper sheet transport or the like is displayed.

A total operation time 608 is displayed in both the initial print settings 605 and the updatable print settings 606. The total operation time necessary for output based on each print setting information is calculated on the basis of the process speed of the device and the number of printing paper sheets and displayed.

A total cost 609 is displayed in both the initial print settings 605 and the updatable print settings 606. The total cost necessary for output based on each print setting information is calculated on the basis of the counter unit cost of the device and the number of printing paper sheets and displayed.

An advanced settings button 610 is provided for each document displayed in the update candidate list 602 to display the advanced setting information of the print settings of the initial print settings 605 and the updatable print settings 606. When the advanced settings button 610 is pressed, an advanced print settings window (not shown) is displayed.

A print setting selection radio button 611 is designed to select one of "use initial settings", "update to new settings", and "add new settings". When the operator selects "use initial settings", the print settings displayed in the initial print settings 605 are registered as the print settings of the box document represented by the document name 604. When restoring the corresponding document, the document management unit 310 registers the contents displayed in the initial print settings 605 as the print settings and post-process settings of the corresponding document in the box document storage unit 3082.

When the operator selects "update to new settings", the print settings of the box document represented by the document name 604 are updated to the print settings displayed in the updatable print settings 606. When restoring the corresponding document, the document management unit 310 updates the print settings and post-process settings of the corresponding document in the box document storage unit 3082 to the contents displayed in the updatable print settings 606.

When the operator selects "add new settings", the print settings displayed in the updatable print settings 606 are added to the print settings of the box document represented by the document name 604. When restoring the corresponding document, the document management unit 310 adds the contents displayed in the updatable print settings 606 to the print settings and post-process settings of the corresponding document in the box document storage unit 3082.

<<Device Configuration Information Table>>

FIG. 7 is a view showing an example of a device configuration information table 700 registered in the device configuration information storage unit 3081. The device configuration information table 700 contains the device information of each device such as the monochrome MFP, color MFP, near-line bookbinding apparatus, and off-line bookbinding apparatus, including a processable function type, process speed, processable amount, and process unit cost. The device configuration information table 700 also contains updating date/time information to manage the updating log of device information.

Registration in the device configuration information table 700 can be done automatically between the devices using MIB (Management Information Base) information via the network 101. Alternatively, the operator may manually set the items by operating a window on the operation PC 102. For example, information of an off-line device represented by the off-line bookbinding apparatus 106 or information such as a unit cost per time of the operator who operates each device is manually registered by causing the operator to operate a window on the operation PC 102.

A device ID 701 is an identifier to specify each device and is issued when the device configuration management unit 309 registers a new device in the device configuration information storage unit 3081. As a setting/updating date/time 702, a date/time when the device information was registered/updated is registered. The device configuration information table 700 also manages the updating log information of each device information. It is therefore possible to uniquely specify a record using the two items, that is, the device ID 701 and the setting/updating date/time 702 as keys.

A device name 703 represents the display name of each device and is used to display the device name on the print setting update confirmation window 500 shown in FIG. 5 or the restoration window 600 shown in FIGS. 6A and 6B. The print output capability (function type, process speed, processable amount, and process unit cost) of the device is registered in a print function 704. The post-process capability (function type, process speed, processable amount, and process unit cost) of the device or a post-processing apparatus in-line-connected to the device is registered in a post-process function 705. Information about bookbinding such as saddle stitch binding or case binding is also registered in the post-process function 705. Pieces of information about accessory devices (feed system and discharge system) in-line-connected to the device are registered in attached accessories 706.

<<Box Document Information Table>>

Figure 8:
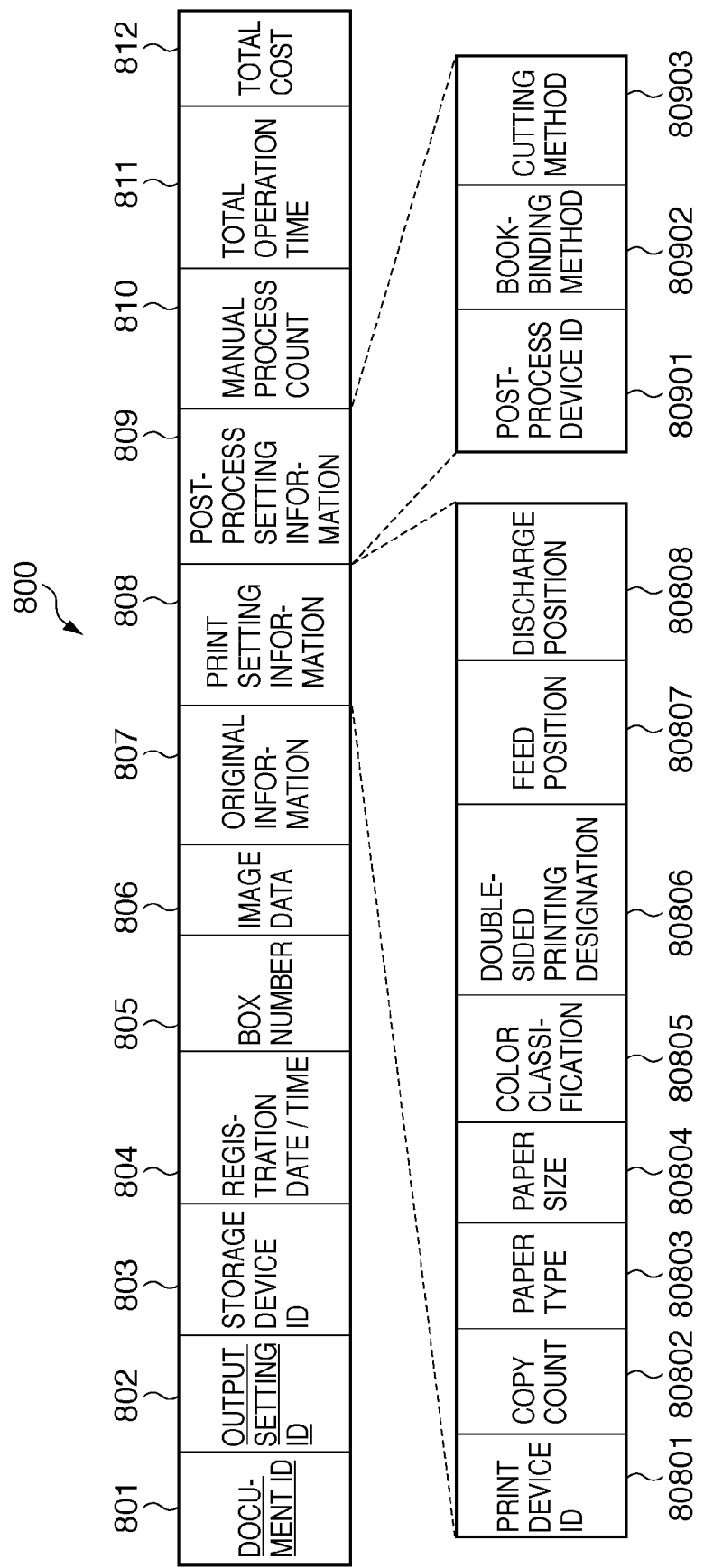
FIG. 8 is a view showing an example of a box document information table.

FIG. 8 is a view showing an example of a box document information table registered in the box document storage unit 3082. A box document is registered from the scanner control unit 304 or the operation PC 102 via the network 101. Note that a restoration target document table to be temporarily rasterized on the memory 302 when restoring a box document has the same arrangement as the box document information table 800.

A document ID 801 is an identifier to specify each document stored in a box and is issued when the document management unit 310 registers a new document in the box document storage unit 3082. An output setting ID 802 is an identifier to specify an output setting including print setting information 808 and post-process setting information 809 set for the box document. It is possible to hold a plurality of output settings for one box document by using the new print setting adding button 509 in the print setting update confirmation window 500 shown in FIG. 5 or selecting "add new settings" of the print setting selection radio button 611 in the restoration window 600 shown in FIGS. 6A and 6B. The output setting ID 802 is used to associate the plurality of output settings with one box document. The box document information table 800 allows uniquely specifying a record using the two items, that is, the document ID 801 and the output setting ID 802 as keys.

A storage device ID 803 sets an identifier to identify a device which stores the box document information. The identifier of the device ID 701 described in the example of the device configuration information table 700 shown in FIG. 7 is set in the storage device ID 803, thereby associating the two tables. A registration date/time 804 sets the registration/updating date/time of the document information. A box number 805 sets an identifier to identify a box in which the document is registered.

Image data 806 is the data of an image input from the scanner control unit 304 or the operation PC 102 via the network 101. The image data may be data of each file or data of each page, or include single or a plurality of data. The image data 806 may be either the entity of image data or an identifier representing image data stored in the storage unit 308.

Original information 807 sets the attributes (e.g., document name, number of pages, color classification, and original size) of the original of the document. The print setting information 808 stores setting information for print output of the document. Detailed examples of the registered contents of the print setting information 808 will be described below. A print device ID 80801 sets an identifier to identify the device which should print the document. If the storage device ID 803 and the print device ID 80801 designate different devices, it means that the image data 806 should be transferred via the network 101 when printing the document. A copy count 80802 represents the number of printed copies to the document. A paper type 80803 represents the type of printing paper sheets such as plain paper, thick paper, or colored paper to be used to print the document. A paper size 80804 represents the size of printing paper sheets such as A4 or A3 to be used to print the document. A double-sided printing designation 80806 is information of double-sided printing/single-side printing to be used to print the document. A feed position 80807 is information of a feed position such as manual feed, cassette, or deck to be used to print the document. A discharge position 80808 is information of a discharge position such as a discharge tray, finisher, or stacker to be used to print the document.

The post-process setting information 809 stores setting information about post-processes after print output of the document. Detailed examples of the registered contents of the post-process setting information 809 will be described below. A post-process device ID 80901 sets an identifier to identify the device which should post-process the document. If the print device ID 80801 and the post-process device ID 80901 designate different devices, it means that the operator should transport the printing paper sheet between the devices after printing of the document. A bookbinding method 80902 stores information of the bookbinding method of the document such as saddle stitch binding or case binding. A cutting method 80903 stores information about a cutting method of the document such as one-side cutting or three-side cutting. A manual process count 810 stores the number of times of operator's manual processes such as the feed process count, discharge process count, or interdevice transport count necessary until completion of the output of the document. A total operation time 811 stores total operation time information representing the sum of a print process time and a post-process time, which are derived from the page information and the copy count 80802 of the original information 807 of the document and speed information managed in the device configuration information table 700. A total cost 812 stores total cost information representing the sum of a print process cost and a post-process cost, which are derived from the original information 807, print setting information 808, and post-process setting information 809 of the document and cost information managed in the device configuration information table 700.

<<Partial Change of Image Data>>

Figure 9:
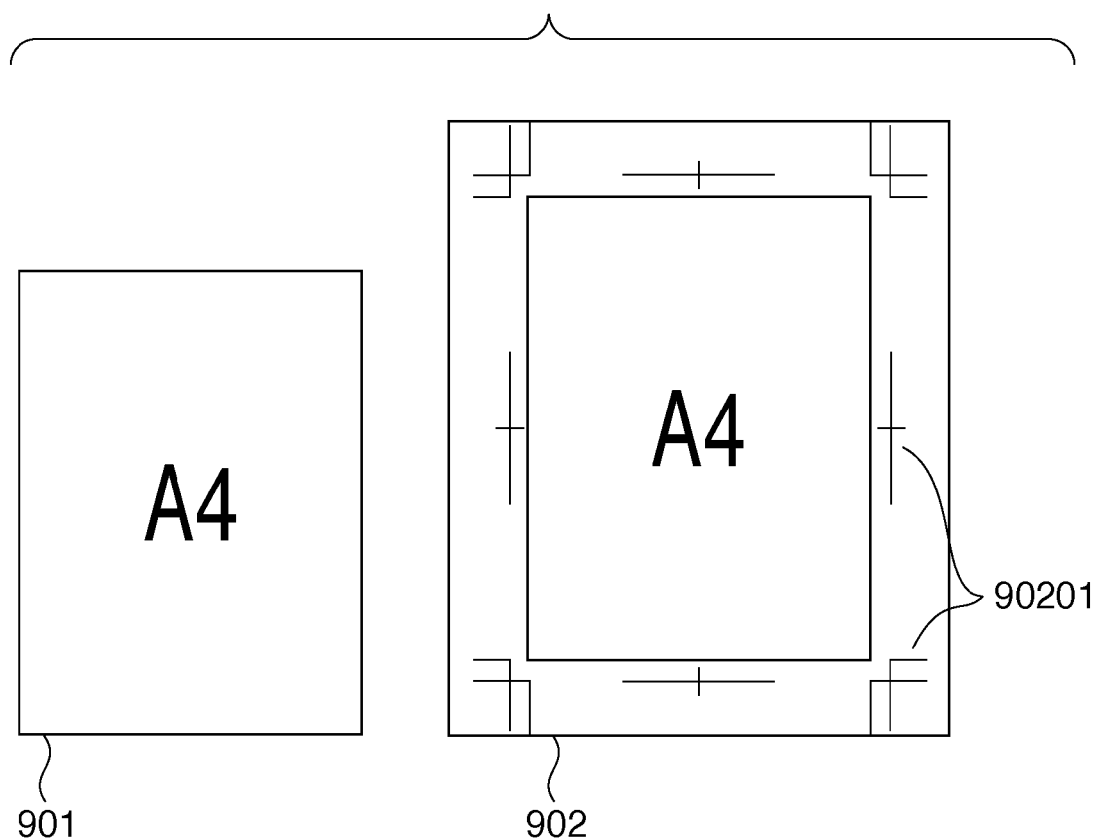
FIG. 9 is a view for explaining an example in which image data is partially changed.

FIG. 9 is a view for explaining an example in which image data is partially changed. Assume that after registration of a box document, the device set in the initial output setting of the box document is removed and is therefore unusable. In this case, the output setting comparison unit 312 may determine that the output result of the document can be obtained by an off-line post-process. For printing or restoration, the image processing unit 313 partially changes the image data of the document, and the output setting comparison unit 312 sets a new output setting which instructs off-line processing.

More specifically, assume that a cutting apparatus in-line-connected to the color MFP 104 has become unusable. In this case, the operator cuts printed paper sheets using an off-line cutting apparatus. For the off-line cutting, the cutting positions are preferably explicitly indicated. Assume that the initial image should be printed on A4 paper, as indicated by initial image data 901. To cut the image using an off-line cutting apparatus after printing, the color MFP 104 prints image data including updated image data 902 and also register marks 90201 representing cutting positions. To change the image data to the updated image data 902, a paper size 80804 of the initial print setting information 808 is changed. For example, if the paper size of the initial print setting information is "A4", it is changed to "A4 plus" larger than the initial paper size by one step. The operator executes a cutting process using an off-line cutting apparatus in accordance with the register marks 90201 of the updated image data 902.

<<Sequence of Embodiment>>

The procedure of processing according to this embodiment will be described below with reference to the flowcharts in FIGS. 10, 11A, and 11B. In this embodiment, a document is stored in a box of the color MFP 104 to which an image forming apparatus is applied. When printing the stored box document, the change points of device configuration information from that upon registering the document (storing the document in the box) are acquired. Additionally, it is determined whether more effective processing can be done by selecting a new output setting different from the initial output setting. A document for which the processing is determined to be more effective is printed based on the new output setting.

FIG. 10 is a flowchart illustrating a procedure of newly registering a document in a box of the color MFP 104. The flowchart illustrates the procedure of processing of causing the operator to operate the operation unit 400 of the color MFP 104, read an original placed on the scanner unit 201, and store the image data in a box. The steps of the flowchart of the present invention are executed by causing the CPU 301 of the color MFP 104 to control the process modules.

In step S1001, the control unit 300 selects a specific box and gives the instruction for "original read" in accordance with an operator instruction via the operation unit 400. The original placed on the scanner unit 201 is read and temporarily stored in the memory 302 as image data under the control of the scanner control unit 304. Assume that the operator who inputs an "original read instruction" sets "paper type: plain paper", "paper size: A4", "color classification: color", "double-sided printing designation: double-sided", and "bookbinding designation: case binding" as print setting information (output setting information).

In step S1002, the document management unit 310 newly registers the document in the box document storage unit 3082. First, the document management unit 310 generates the document ID 801 and output setting ID 802 to add a new record to the box document information table 800 and acquires the current time as the registration date/time 804. The document management unit 310 also sets an identifier representing the color MFP 104 as the storage device ID 803. The number of the box designated in step S1001 is assigned to the box number 805. A new record is added, and the values 801 to 805 are set in the record. In step S1003, the document management unit 310 sets the following values in the new record generated in step S1002. The document management unit 310 stores, in the storage unit 308, the image data primarily stored in the memory 302 in step S1001 and sets an identifier representing the image data in the image data 806. The document management unit 310 sets, in the original information 807, original information such as the number of pages of the image data, and the original size.

The document management unit 310 also sets, in the print setting information 808, various values set by the operator. An identifier representing the color MFP 104 is set in the print device ID 80801. A designated number of copies are set in the copy count 80802. An identifier representing plain paper is set in the paper type 80803. An identifier representing A4 is set in the paper size 80804. An identifier representing color is set in a color classification 80805. An identifier representing double-sided printing is set in the double-sided printing designation 80806. The document management unit 310 sets, in the feed position 80807, one of feed positions of the color MFP 104 where the paper designated by the operator can be fed. The document management unit 310 designates, in the discharge position 80808, one of discharge positions of the color MFP 104 suitable for a finishing method designated by the operator.

The document management unit 310 also sets, in the post-process setting information 809, various values set by the operator. An identifier representing, for example, the near-line bookbinding apparatus 105 is set in the post-process device ID 80901. An identifier representing case binding is set in the bookbinding method 80902.

In step S1004, the document management unit 310 calculates the manual process count, total operation time, and total cost based on the information set in the original information 807, print setting information 808, and post-process setting information 809. A manual process count calculation method will be described. For example, for the number of times of operation of the printing paper sheet discharge unit, the document management unit 310 derives the number of printed sheets based on the page information contained in the original information 807 and the information (e.g., copy count 80802) of the print setting information 808. Next, the document management unit 310 and the device configuration management unit 309 cooperatively derive, from the device configuration information storage unit 3081, the number of paper sheets mountable at the discharge position 80808 using the identifier of the print device ID 80801 as a key. The document management unit 310 divides the number of printed sheets by the mountable number of sheets, thereby deriving the number of times of operation of the discharge unit which requires the operator's manual operation.

As another example of the manual process count calculation method, for the number of times of feed process, the document management unit 310 derives the number of printed sheets by the above-described method. Next, the document management unit 310 and the device configuration management unit 309 cooperatively derive, from the device configuration information storage unit 3081, the number of paper sheets mountable at the feed position 80807 using the identifier of the print device ID 80801 as a key. The document management unit 310 divides the number of printed sheets by the mountable number of sheets, thereby deriving the number of times of operation of the feed process which requires the operator's manual operation.

As still another example of the manual process count calculation method, for the number of times of printing paper sheet transport between devices, the document management unit 310 first compares the print device ID 80801 with the post-process device ID 80901. If the IDs have different values, the document management unit 310 determines that the operator needs to transport the printed product at least once between the devices. Next, the document management unit 310 derives the number of printed sheets by the above-described method. Then, the document management unit 310 and the device configuration management unit 309 cooperatively derive, from the device configuration information storage unit 3081, the number of paper sheets mountable at the discharge position 80808 using the identifier of the print device ID 80801 as a key. The document management unit 310 divides the number of printed sheets by the mountable number of sheets, thereby deriving the number of times of operation of the discharge unit, that is, the necessary number of times of printed product transport by the operator between the devices.

An example of a total operation time calculation method will be described. When the near-line bookbinding apparatus 105 should bind a book of the printing result of the color MFP 104, the document management unit 310 derives the number of printed sheets by the above-described method. Next, the document management unit 310 derives the printing speed from the device configuration information storage unit 3081 using the identifier of the print device ID 80801 as a key and the post-process speed from the device configuration information storage unit 3081 using the identifier of the post-process device ID 80901 as a key. The document management unit 310 divides each speed by the number of printed sheets, thereby deriving the process times. The total operation time can be derived by adding the process times.

An example of a total cost calculation method will be described. When the near-line bookbinding apparatus 105 should bind a book of the printing result of the color MFP 104, the document management unit 310 derives the number of printed sheets by the above-described method. Next, the document management unit 310 derives the print unit cost from the device configuration information storage unit 3081 using the identifier of the print device ID 80801 as a key and the post-process unit cost from the device configuration information storage unit 3081 using the identifier of the post-process device ID 80901 as a key. The document management unit 310 multiplies each cost by the number of printed sheets, thereby deriving the costs. The total cost can be derived by adding the costs.

The document management unit 310 sets the values obtained by the above-described calculations in the manual process count 810, total operation time 811, and total cost 812 of the new record generated in step S1002. The series of processes of causing the operator to read the original placed on the scanner unit 201 and store the image data in a box thus ends.

Figure 11A:
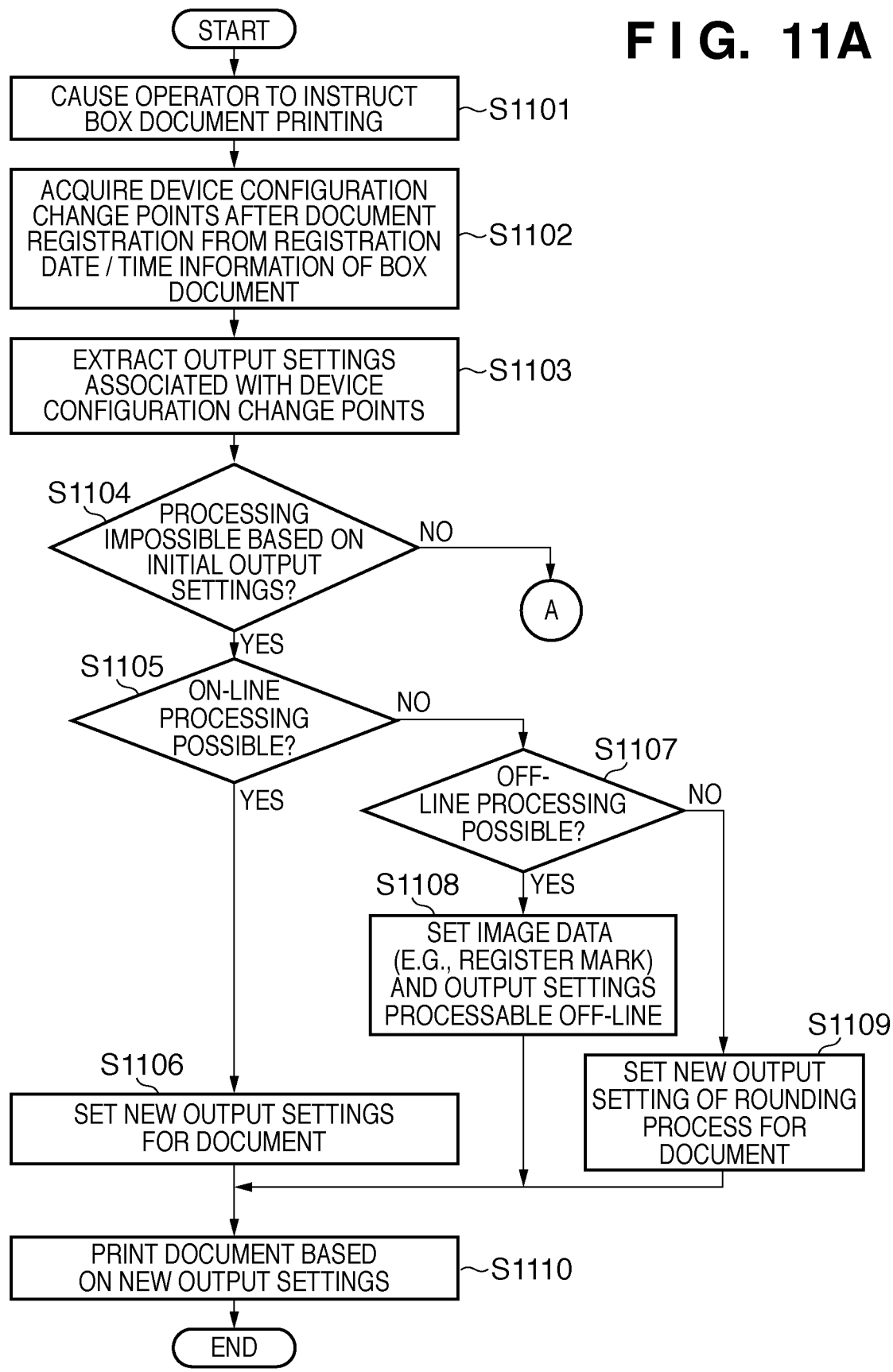
FIGS. 11A and 11B are flowcharts illustrating the procedure of processing of storing a document in a box of the color MFP and printing the stored document after the device configuration has changed.
Figure 11B:
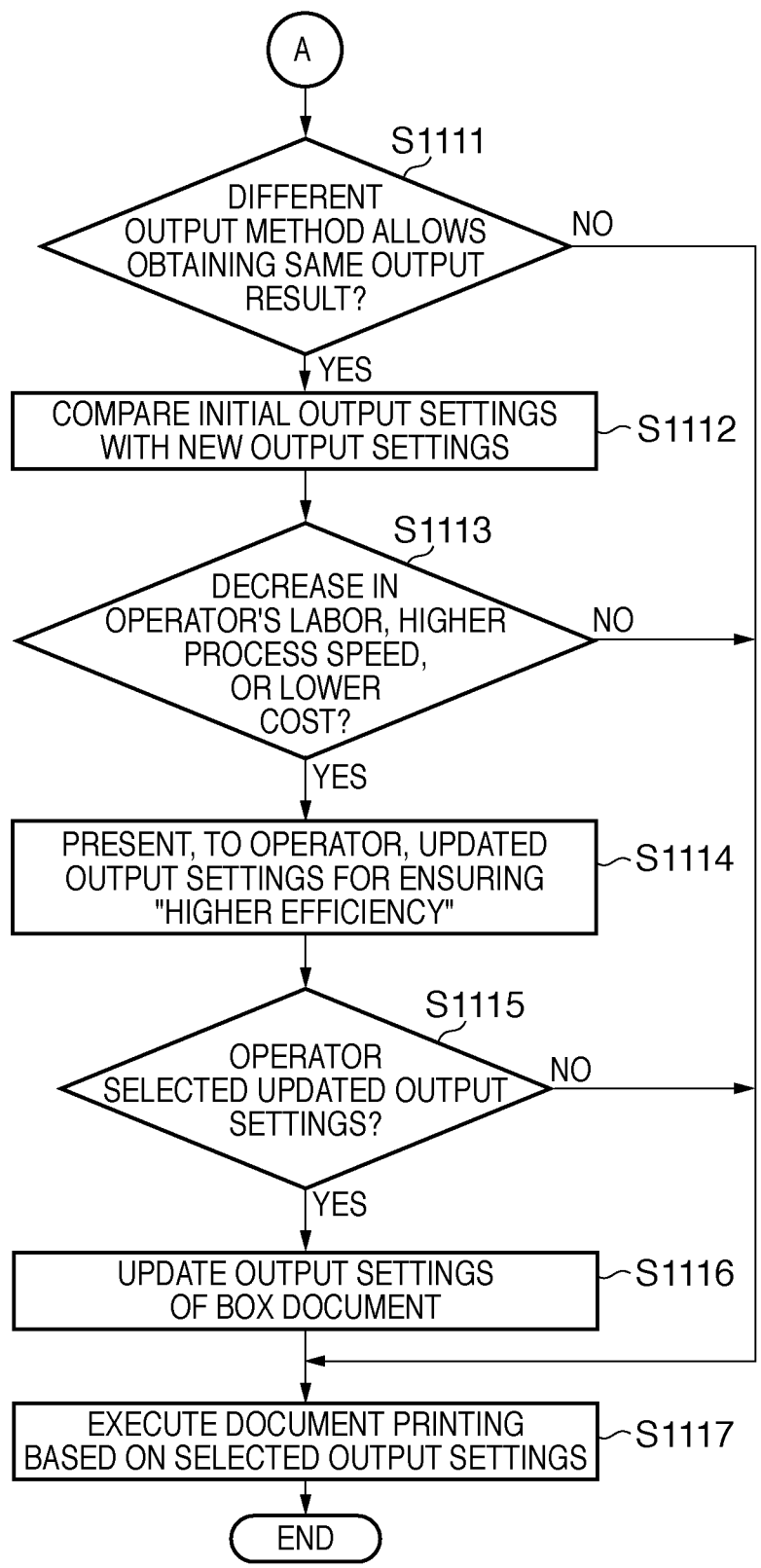

FIGS. 11A and 11B are flowcharts illustrating the procedure of processing of storing a document in a box of the color MFP and printing the stored document after the device configuration has changed.

A detailed process sequence of changing the device configuration will be omitted. If the device configuration has been changed by, for example, adding a new device, the device configuration management unit 309 updates the device configuration information table 700 by adding a record. When the device configuration management unit 309 updates the device configuration information table 700, the updating date/time information of the record is set in the setting/updating date/time 702.

In step S1101, the control unit 300 selects a specific document held in a box and gives the instruction for "print" in accordance with an operator's operation via the operation unit 400.

In step S1102, the document management unit 310 acquires registration date/time information from the registration date/time 804 included in the box document information table 800 of the document selected by the operator. Next, the device configuration management unit 309 acquires the difference corresponding to change points between the device configuration after document registration and the current device configuration from the device configuration information table 700 in the device configuration information storage unit 3081 using the acquired registration date/time information and the current time information. The change points of the device configuration are acquired as the change points of the function items such as the print function 704 and the post-process function 705.

In step S1103, the document management unit 310 extracts, in the print setting information 808 and the post-process setting information 809 of the box document, output setting items associated with the device configuration change points acquired in step S1102.

In step S1104, the output setting comparison unit 312 determines in consideration of the device configuration change whether processing is possible based on the initial output settings of the print setting information 808 and the post-process setting information 809 of the box document. If it is determined that the processing is possible, the process advances to step S1111. On the other hand, if it is determined that the processing based on the initial output settings is impossible, the process advances to step S1105.

Step S1104 is executed by causing the output setting comparison unit 312 to determine whether the functions necessary for executing the items of the output settings of the box document acquired in step S1103 are lost due to the device configuration change points acquired in step S1102.

In step S1105, the output setting comparison unit 312 determines based on the acquired device configuration change point information whether the output settings of the document can be processed by an in-line apparatus or a near-line apparatus connected via the network 101. If it is determined that the processing is possible, the process advances to step S1106. If it is determined that the processing is impossible, the process advances to step S1107.

In step S1106, the output setting comparison unit 312 sets, for the document, new output settings to be processed by an in-line apparatus or a near-line apparatus connected via the network 101 using the latest device configuration information acquired from the device configuration information table 700. Assume that an in-line case binding apparatus connected to the color MFP 104 at the time of box document registration does not exist at the time of document printing because of a device configuration change. In this case, the output setting comparison unit 312 changes the device represented by the post-process device ID 80901 of the post-process setting information 809 from the color MFP 104 to the near-line bookbinding apparatus 105 connected near-line as a post-process setting in printing. As described above, a device in the initial output settings is automatically changed to a compatible on-line device (for example, a case binding apparatus connected in-line changes to a near-line bookbinding apparatus), thereby setting new output settings.

In step S1107, the output setting comparison unit 312 acquires off-line processing apparatus information from the device configuration information table 700. Then, the output setting comparison unit 312 determines based on the item of the post-process function 705 of the acquired off-line processing apparatus whether the processing associated with the post-process settings of the box document can be executed. More specifically, the output setting comparison unit 312 determines whether the items of the post-process settings of the document are included in the items of the post-process function 705 of the off-line processing apparatus. If it is determined that the processing is possible, the process advances to step S1108. If the output setting comparison unit 312 determines in step S1107 that the processing is impossible even using the off-line apparatus, the process advances to step S1109. Note the information of an off-line processing apparatus represented by the off-line bookbinding apparatus 106 is registered in advance in the device configuration information table 700 by the operator.

In step S1108, the output setting comparison unit 312 sets, in the output setting of interest, new output settings necessary for off-line processing using off-line post-processing apparatus information included in the latest device configuration information acquired from the device configuration information table 700. If the output setting comparison unit 312 then determines that the image data needs to be changed, the image processing unit 313 is instructed to change the image data included in the image data 806. A description of the image data change has been done above with reference to FIG. 9 and will not be repeated here. Another example of image data change by the image processing unit 313 will be explained. Assume that the print settings upon registering the box document define printing the image data 806 after it is composited with specific "watermark data". However, when the image data should be transferred to another printer, the "watermark data" may be absent in the printer of the transfer destination. In this case, the image processing unit 313 is instructed to change the image data included in the image data 806 by compositing the "watermark data" with it in advance.

In step S1109, for, out of the output settings of the document, settings neither an on-line apparatus nor an off-line apparatus can process, the output setting comparison unit 312 sets a new output setting of a "rounding process" to delete the setting. Assume that the post-process setting information 809 upon registering the box document includes a setting of a laminating process, and the laminating apparatus does not exist at the time of printing. In this case, the output setting comparison unit 312 updates the post-process setting information 809 by deleting the setting of the laminating process.

In step S1110, under the control of the printer control unit 305 or the post-process control unit 306, the color MFP 104 prints the box document and performs post-processes based on the new output settings set by the output setting comparison unit 312. Before print output, the updated output settings of the document may be displayed on the screen of the touch panel unit 401 whose display is controlled by the operation control unit 307. The series of processes of coping with a box document which cannot be processed based on the initial output settings of the print setting information 808 or the post-process setting information 809 due to a change in the device configuration thus ends.

A procedure to be executed upon determining in step S1104 that the processing is possible (NO in step S1104) will be described. In step S1111, the output setting comparison unit 312 acquires latest device configuration information from the device configuration information table 700 of the associated device on the basis of the print setting information 808 and the post-process setting information 809 of the document and the device configuration change point information acquired by the document management unit 310. If new output settings based on the latest device configuration information, which are different from the initial output settings, enable to obtain the same output result as that obtained based on the initial output settings, the output setting comparison unit 312 generates the new output settings.

In step S1111, it is determined whether the new output settings are usable. If it is determined that they are usable, the process advances to step S1112. If it is determined that the new output settings are not usable, the process advances to step S1117.

In step S1112, the output setting comparison unit 312 compares the initial output settings with the new output settings in terms of efficiency. The output setting comparison unit 312 performs the comparison concerning three points. First, the number of times of manual processes necessary in the new output settings is calculated and compared with the value of the manual process count 810 of the document. Second, the total operation time necessary in the new output settings is calculated and compared with the value of the total operation time 811 of the document. Third, the total cost necessary in the new output settings is calculated and compared with the value of the total cost 812 of the document.

A description of detailed examples of the calculations of the manual process count, total operation time, and the like has been done above with reference to FIG. 5 and will not be repeated.

In step S1113, the output setting comparison unit 312 determines based on the result of comparison between the initial output settings and the new output settings whether selection of the new output settings allows decreasing the number of times of operator's manual processes, the total operation time, or the total cost. If it is determined that selection of the new output settings allows to decrease the number of times of operator's manual processes, the total operation time, or the total cost, the process advances to step S1114. If it is determined that selection of the new output settings does not allow to decrease the number of times of operator's manual processes, the total operation time, or the total cost, the process advances to step S1117. In this embodiment, it is possible to determine new output settings capable of raising the process efficiency as compared to the initial output settings in the above-described way.

In step S1114, the output setting comparison unit 312 instructs the operation control unit 307 to display the new output settings of the document on the touch panel unit 401. A window like the print setting update confirmation window 500 in FIG. 5 is displayed on the touch panel unit 401. This window displays the initial output settings and the new output settings. The operator can arbitrarily select the new output settings as settings for output.

In step S1115, the control unit 300 determines whether the operator has selected output based on the new output settings by, for example, pressing the new print setting updating button 508 on the print setting update confirmation window 500 shown in FIG. 5. If the operator has selected output based on the new output settings, the process advances to step S1116. If the operator has canceled selection of the new output settings by, for example, pressing the back button 510 on the print setting update confirmation window 500 in FIG. 5 because he/she wants output based on the initial output settings, the process advances to step S1117.

In step S1116, the output setting comparison unit 312 sets the new output settings for the document. At this time, the output setting comparison unit 312 can instruct the document management unit 310 to update or additionally set and store the print setting information 808 or the post-process setting information 809 of the box document information table 800 in the box document storage unit 3082.

In step S1117, under the control of the printer control unit 305 or the post-process control unit 306, the color MFP 104 prints the box document and performs post-processes based on the output settings set by the output setting comparison unit 312. The series of processes of outputting a box document based on new output settings different from initial output settings set in the print setting information 808 or the post-process setting information 809 because of a change in the device configuration thus ends.

The flowcharts in FIGS. 11A and 11B have been described using, as an example, printing of a box document stored in the color MFP 104. The flowcharts are also applicable to printing of a document stored in another image forming apparatus. The flowcharts are also applicable to managing, in the storage device of an information processing apparatus like the operation PC 102, the same document as in the box document information table 800 described with reference to FIG. 8.

Backing up a document stored in a box of the color MFP 104 to which the image forming apparatus according to the typical embodiment of the present invention is applied and restoring the backed-up document will be considered below with reference to the flowcharts of FIGS. 12, 13A, and 13B. In these flowcharts, change points from device configuration information upon registering a document are acquired, and it is determined whether selection of new output settings different from initial output settings increases the efficiency. For a document for which the processing is determined to be more effective, the output settings of the box document are updated to the new output settings, or the new output settings are added, and the document is then restored.

Figure 12:
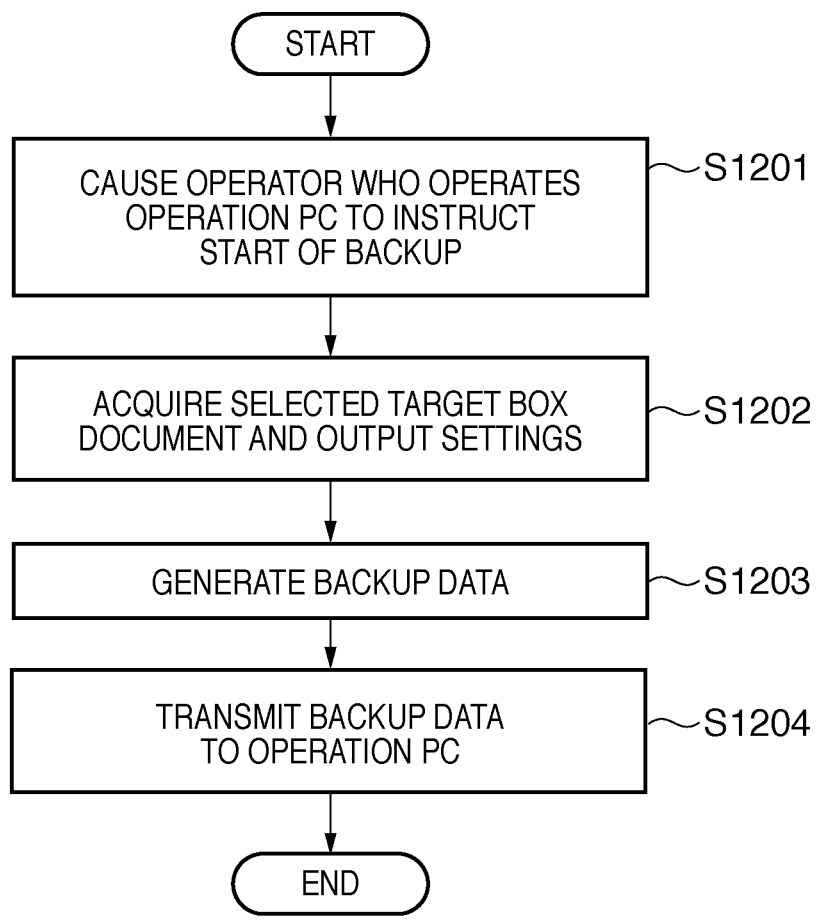
FIG. 12 is a flowchart illustrating the procedure of processing of backing up a plurality of documents stored in a box of the color MFP.

FIG. 12 is a flowchart illustrating the procedure of processing of backing up a plurality of documents stored in a box of the color MFP 104. The flowchart represents a process sequence of causing the operator to operate a window on the operation PC 102 connected to the color MFP 104 via the network 101 and backing up a box document in the color MFP 104 to the storage area of the operation PC 102.

In step S1201, the control unit 300 receives, from the operation PC 102 operated by the operator, a request to execute backup of a box document in the color MFP 104. A document, a box, or all documents can be specified as the backup target. In step S1202, the backup/restoration control unit 311 instructs the document management unit 310 to acquire, from the box document storage unit 3082, information of at least one box document designated as the backup target. At least one piece of acquired box document information contains a record of the box document information table 800 including the print setting information 808 and the post-process setting information 809 and the real file data of the image data 806. In step S1203, the backup/restoration control unit 311 generates the backup data of at least one box document. The backup/restoration control unit 311 generates the backup data as one file by encrypting and compressing the box document information acquired in step S1202. In step S1204, the backup/restoration control unit 311 transmits the generated backup data to the operation PC 102 via the external interface 303 and the network 101 as a response to the request received from the operation PC 102 in step S1201.

The operator designates the storage location on a backup window displayed on the Web browser on the operation screen of the operation PC 102, thereby storing the backup data in the storage area of the operation PC 102. The series of processes of causing the operator to operate the operation PC 102 and back up a box document thus ends.

Figure 13A:
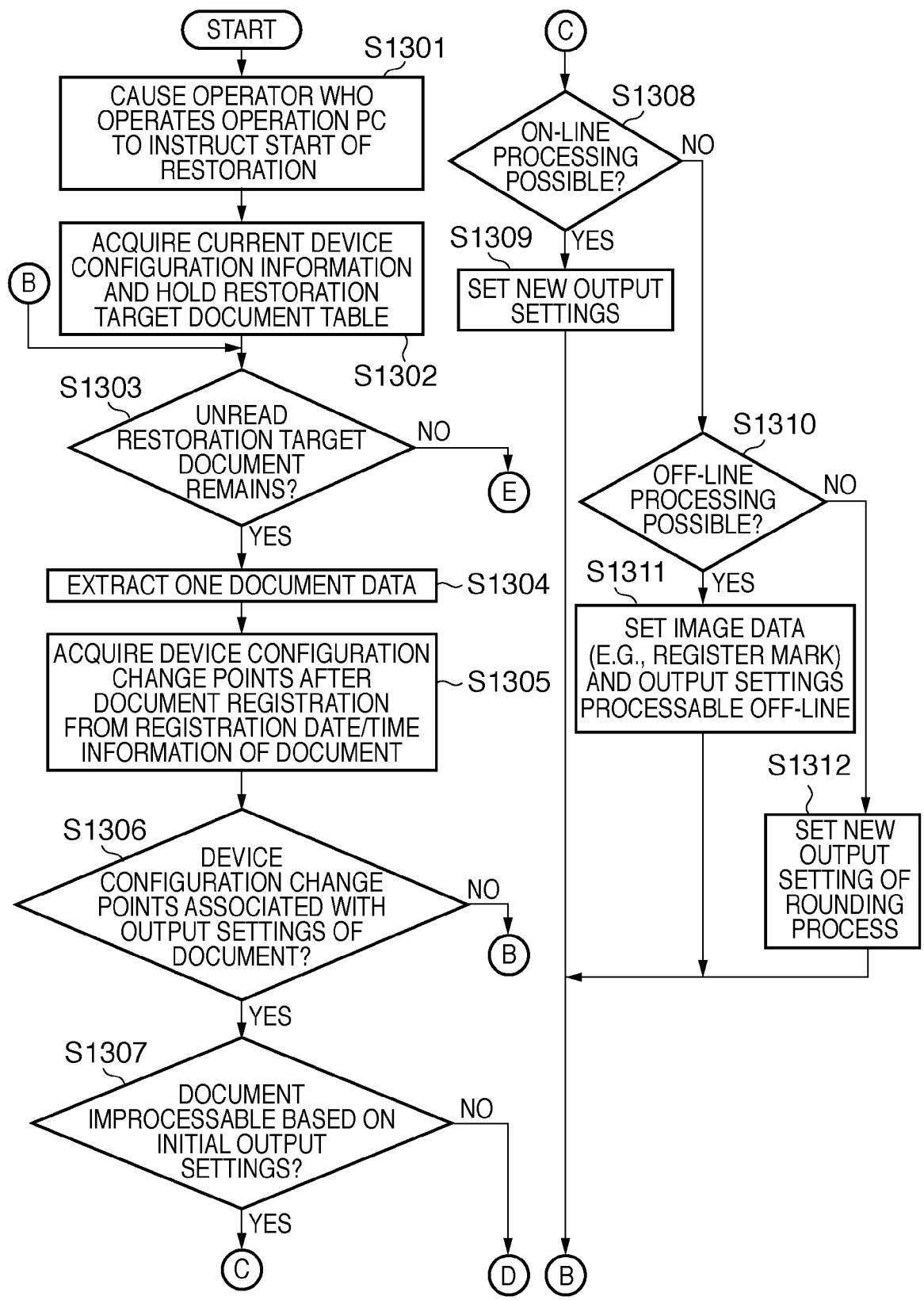
FIGS. 13A and 13B are flowcharts illustrating the procedure of processing of backing up a box document and restoring the document after the device configuration has changed.
Figure 13B:
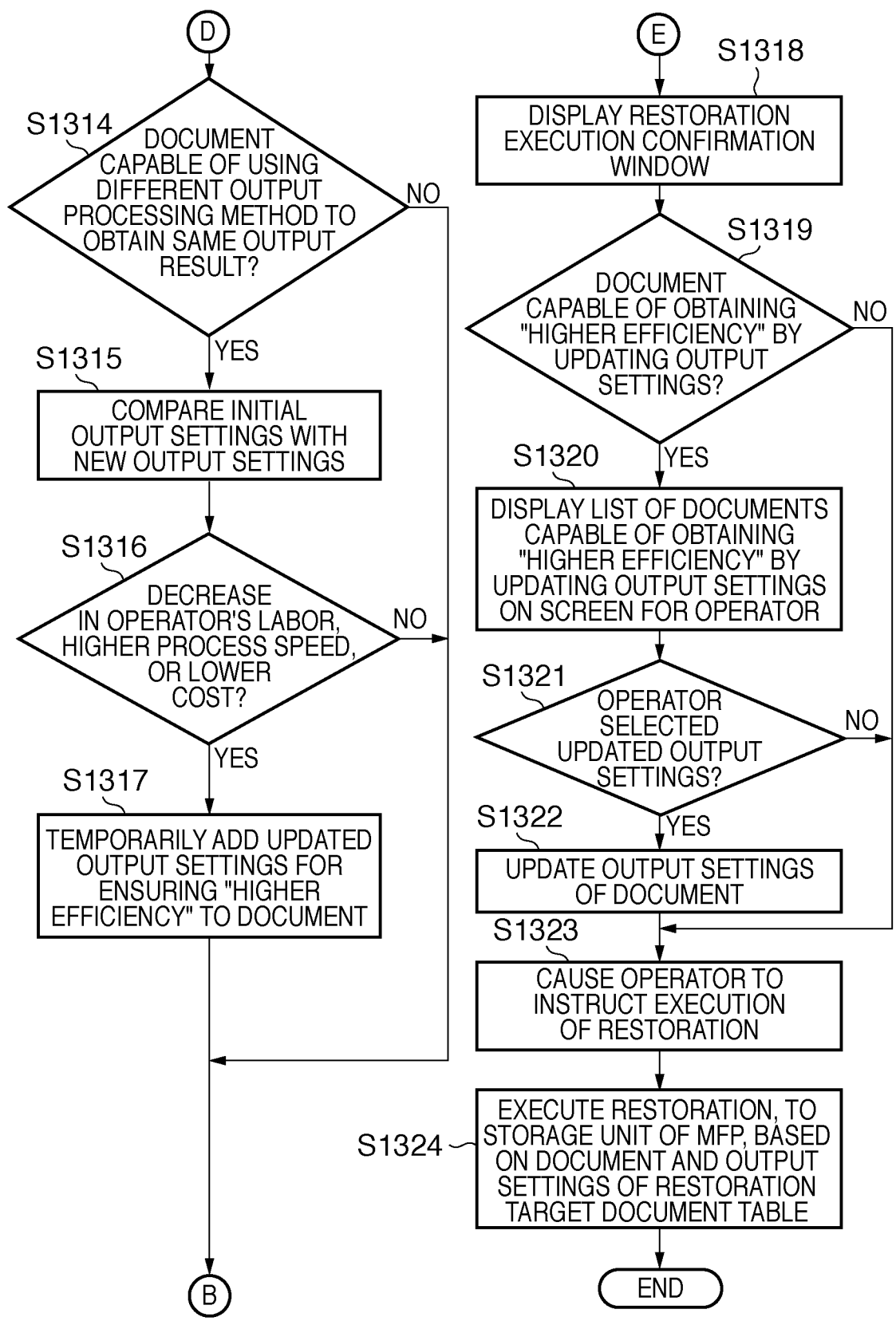

FIGS. 13A and 13B are flowcharts illustrating a series of processes of, after the device configuration has changed, restoring the box document which has been backed up as described with reference to the flowchart in FIG. 12. The backup data in FIG. 12 is restored data in FIGS. 13A and 13B.

If the device configuration is changed by, for example, adding a new device, the device configuration management unit 309 of the control unit 300 updates the device configuration information table 700 in the device configuration information storage unit 3081 by adding a record. When the device configuration management unit 309 updates the device configuration information table 700, the setting/updating date/time information of the record is set in the setting/updating date/time 702.

In step S1301, the operator operates a window displayed on the Web browser on the operation PC 102 connected to the color MFP 104, and the control unit 300 receives an instruction to start restoring backup data stored in the storage area of the operation PC 102. The backup/restoration control unit 311 receives the backup data via the network 101, rasterizes and decodes it on the memory 302, and holds, on the memory 302, a restoration target document table having the same arrangement as the box document information table 800.

In step S1302, the device configuration management unit 309 acquires current device configuration information from the device configuration information table 700 in the device configuration information storage unit 3081.

If the backup/restoration control unit 311 has read out all restoration target documents in step S1303, the process advances to step S1318. On the other hand, if unread document data still remains in the restoration target document table, the process advances to step S1304.

In step S1304, the backup/restoration control unit 311 reads out one document data from the restoration target document table held on the memory 302 in step S1301.

In step S1305, the document management unit 310 acquires the registration date/time information of the document data from the restoration target document table. Next, the device configuration management unit 309 acquires the difference corresponding to change points between the device configuration after document registration and the current device configuration from the device configuration information table 700 in the device configuration information storage unit 3081 based on the registration date/time information. The change points of the device configuration are acquired as the change points of the function items such as the print function 704 and the post-process function 705.

In step S1306, the backup/restoration control unit 311 acquires out of the acquired change points of the device configuration, output setting items associated with the print setting information and post-process setting information of the document data. If it is determined that associated items exist, the process advances to step S1307. If it is determined that no associated items exist, the process returns to step S1303.

If the output setting comparison unit 312 determines in step S1307 that processing is possible in the current device configuration based on the initial output settings set for the document, the process advances to step S1314. If it is determined that the processing based on the initial output settings is impossible, the process advances to step S1308.

Whether the processing is possible based on the initial output settings is determined basically in accordance with the same procedure as in step S1104, and a description thereof will not be repeated.

If the output setting comparison unit 312 determines in step S1308 based on the acquired device configuration change point information that the output settings of the document can be processed by an in-line apparatus or a near-line apparatus connected via the network 101, the process advances to step S1309. If it is determined that the output settings of the document cannot be processed by an in-line apparatus or a near-line apparatus connected via the network 101, the process advances to step S1310.

In step S1309, the output setting comparison unit 312 sets, for the document of the restoration target document table, new output settings to be processed by an in-line apparatus or a near-line apparatus connected via the network 101 using the latest device configuration information. Assume that an in-line case binding apparatus connected to the color MFP 104 at the time of box document registration does not exist at the time of document restoration because of a device configuration change. In this case, the output setting comparison unit 312 changes the device represented by the post-process device ID 80901 of the post-process setting information 809 of the document of the restoration target document table from the color MFP 104 to the near-line bookbinding apparatus 105 connected near-line as a post-process setting in restoration. After the process in step S1309, the process returns to step S1303.

In step S1310, the output setting comparison unit 312 acquires, from the device configuration information table 700, the information of an off-line processing apparatus associated with the items of the output settings of the document data acquired in step S1306. Then, the output setting comparison unit 312 determines whether the items of the post-process settings of the document data are included in the items of the post-process function 705 of the acquired off-line processing apparatus. If it is determined that the items of the post-process settings of the document are included in the items of the post-process function 705 of the off-line processing apparatus, and the processing is possible using the off-line apparatus, the process advances to step S1311. If it is determined that the items of the post-process settings of the document are not included in the items of the post-process function 705 of the off-line processing apparatus, and the processing is impossible even using the off-line apparatus, the process advances to step S1312. Note the information of an off-line processing apparatus represented by the off-line bookbinding apparatus 106 is registered in advance in the device configuration information table 700 by the operator.

In step S1311, the output setting comparison unit 312 sets, in the output setting of the document data of the restoration target document table, new output settings to be processed off-line using off-line post-processing apparatus information included in the latest device configuration information. If the output setting comparison unit 312 then determines that the image data needs to be changed, the image processing unit 313 is instructed to change the image data included in the image data 806 of the document of the restoration target document table. A description of a detailed example of the image data change has been done above with reference to FIG. 9 and step S1108 and will not be repeated here.

In step S1312, for, out of the output settings of the document of the restoration target document table, settings neither an on-line apparatus nor an off-line apparatus can process, the output setting comparison unit 312 sets a new output setting of a "rounding process" to delete the setting. A detailed example of step S1312 is the same as that of step S1109 described above. At this time, the output setting comparison unit 312 updates the post-process setting information 809 of the restoration target document table. After the process in step S1312, the process returns to step S1303.

A procedure to be executed upon determining in step S1307 that the processing is possible will be described. In step S1314, if new output settings different from the initial output settings enable to obtain the same output result as that obtained based on the output settings of the document of the restoration target document table, the output setting comparison unit 312 generates the new output settings. The output settings include the print setting information 808 and the post-process setting information 809. To generate the new output settings, the device configuration change point information acquired by the document management unit 310 in step S1305 and the latest device configuration information acquired by the device configuration management unit 309 in step S1302 are used. If the new output settings are usable, the process advances to step S1315. If the new output settings are not usable, the process returns to step S1303.

In step S1315, the output setting comparison unit 312 compares the initial output settings with the new output settings. The output setting comparison unit 312 performs the comparison concerning three points. First, the number of times of manual processes necessary in the new output settings is calculated and compared with the value of the manual process count 810 of the document of the restoration target document table. Second, the total operation time necessary in the new output settings is calculated and compared with the value of the total operation time 811 of the document of the restoration target document table. Third, the total cost necessary in the new output settings is calculated and compared with the value of the total cost 812 of the document of the restoration target document table.

In step S1316, the output setting comparison unit 312 determines based on the result of comparison between the initial output settings and the new output settings whether selection of the new output settings allows decreasing the number of times of operator's manual processes, the total operation time, or the total cost. If it is determined that selection of the new output settings allows to decrease the number of times of operator's manual processes, the total operation time, or the total cost, the process advances to step S1317. If it is determined that selection of the new output settings does not allow to decrease the number of times of operator's manual processes, the total operation time, or the total cost, the process returns to step S1303.

In step S1317, the output setting comparison unit 312 instructs the document management unit 310 to temporarily add the print setting information 808 and the post-process setting information 809 based on the new output settings to the document of the restoration target document table. After the process in step S1317, the process returns to step S1303.

When all documents in the restoration target document table are read out, the process advances to step S1318. In step S1318, the backup/restoration control unit 311 returns a restoration execution confirmation window via the network 101 as a response to the restoration start request issued from the Web browser on the operation PC 102 in step S1301. Then, a restoration execution confirmation window including the information of the documents to be restored as shown in FIGS. 6A and 6B is displayed on the Web browser on the operation PC 102.

In step S1319, the output setting comparison unit 312 determines whether new output settings capable of decreasing the number of times of operator's manual processes, the total operation time, or the total cost are temporarily added to the restoration target document table.

In step S1320, the backup/restoration control unit 311 displays, on the restoration execution confirmation window, a list of new output settings as exemplified by the update candidate list 602 on the restoration window 600 shown in FIGS. 6A and 6B. This window displays the initial output settings and the new output settings. The operator can arbitrarily select the new output settings.

In step S1321, the backup/restoration control unit 311 determines whether the operator has selected updating to the new output settings for at least one document on the restoration execution confirmation window.

In step S1322, the backup/restoration control unit 311 executes the following process for, out of the documents of the restoration target document table, the document for which updating to the new output settings is selected in step S1321. The backup/restoration control unit 311 instructs the document management unit 310 to update the print setting information 808 or the post-process setting information 809 of the restoration target table based on the new output settings temporarily added to the document of the restoration target document table.

In step S1323, the operator performs an operation of, for example, pressing the restoration execution button on the restoration execution confirmation window, and the control unit 300 receives a restoration execution instruction. In step S1324, the backup/restoration control unit 311 starts restoring the document information stored in the restoration target document table on the memory 302 to the box document information table 800 of each document in the box document storage unit 3082 of the storage unit 308. The backup/restoration control unit 311 instructs the document management unit 310 to extract the documents from the restoration target document table one by one. The document information in the box document information table 800 in the box document storage unit 3082 is updated based on the set image data, print setting information, and post-process setting information.

The series of processes of restoring a box document when the device configuration has changed after backup of the box document thus ends.

The flowcharts in FIGS. 13A and 13B have been described using, as an example, restoration of a box document to the color MFP 104. The flowcharts are also applicable to restoration of a document to another image forming apparatus. If the same document management as in the box document information table 800 described with reference to FIG. 8 is done in the storage device of an information processing apparatus like the operation PC 102, the flowcharts are also applicable to restoration to the information processing apparatus.

In the present invention, a storage medium which stores software program codes for implementing the above-described functions may be supplied to a system or apparatus, and the information processing apparatus (e.g., CPU) of the system or apparatus may read out and execute the program codes stored in the storage medium. In this case, the program codes read out from the storage medium implement the functions of the above-described embodiments by themselves, and the storage medium which stores the program codes constitutes the present invention.

The functions of the above-described embodiments may be implemented by causing an operating system (OS) running on the information processing apparatus to partially or wholly execute actual processing on the basis of the instructions of the program codes.

The program (image forming program) codes read out from the storage medium may be written in the storage medium of a function expansion card inserted into the information processing apparatus or a function expansion unit connected to the information processing apparatus. In this case, the functions of the above-described embodiments may be implemented by causing the CPU of the function expansion card or function expansion unit to partially or wholly execute actual processing on the basis of the instructions of the program codes.

The software program codes for implementing the functions of the above-described embodiments may be delivered via a network and stored in a storage means such as the hard disk or memory of the system or apparatus or a storage medium such as a CD-RW or CD-R. In this case, the information processing apparatus (or CPU) of the system or apparatus may read out and execute the program codes stored in the storage means or storage medium.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-025735, filed Feb. 5, 2008, which is hereby incorporated by reference herein in its entirety.

What is claimed is:

1. An image forming apparatus for storing document data for which output setting data is set, comprising:
    an acquisition unit configured to acquire device configuration information of the image forming apparatus and device configuration information of a print post-processing apparatus which is connected to the image forming apparatus and has a paper transport path not connected to the image forming apparatus;
    a change unit configured to, in a case where the device configuration information acquired by said acquisition unit differs from the device configuration information corresponding to when the document data was stored, change the output setting data of the stored document data, in accordance with the difference of the device configuration information, by using the device configuration information acquired by said acquisition unit;
    a processing unit configured to process the document data by using the output setting data changed by said change unit;
    a determination unit configured to determine, by referring to the device configuration information acquired by said acquisition unit after the document data is stored, whether a print post-processing apparatus not connected to the image forming apparatus is necessary for obtaining a printing result which is the same as a printing result before the document data is stored; and
    an editing unit configured to edit image data contained in the document data for the print post-processing apparatus not connected to the image forming apparatus in a case where said determination unit determines that the print post-processing apparatus not connected to the image forming apparatus is necessary.

2. The apparatus according to claim 1, further comprising:
    a generation unit configured to generate new output setting data by using the device configuration information acquired by said acquisition unit; and
    a decision unit configured to decide output setting data having a highest process efficiency among the new output setting data generated by said generation unit and the output setting data set for the stored document data.

3. The apparatus according to claim 2, wherein the process efficiency is a number of times of manual processes.

4. The apparatus according to claim 2, wherein the process efficiency is a time period required for a process.

5. The apparatus according to claim 2, wherein the process efficiency is a cost required for a process.

6. An image forming method executed in an image forming apparatus for storing document data for which output setting data is set, comprising the steps of:
    acquiring device configuration information of the image forming apparatus and device configuration information of a print post-processing apparatus which is connected to the image forming apparatus and has a paper transport path not connected to the image forming apparatus;
    changing, in a case where the device configuration information acquired by said acquiring step differs from the device configuration information corresponding to when the document data was stored, the output setting data of the stored document data, in accordance with the difference of the device configuration information, by using the device configuration information acquired in said acquiring step;

processing the document data by using the output setting data changed in said changing step;

determining, by referring to the device configuration information acquired by said acquiring step after the document data is stored, whether a print post-processing apparatus not connected to the image forming apparatus is necessary for obtaining a printing result which is the same as a printing result before the document data is stored; and editing image data contained in the document data for the print post-processing apparatus not connected to the image forming apparatus in a case where said determining step determines that the print post-processing apparatus not connected to the image forming apparatus is necessary.

7. The image forming method according to claim 6, further comprising:

generating new output setting data by using the device configuration information acquired by said acquiring step; and deciding output setting data having a highest process efficiency among the new output setting data generated by said generating step and the output setting data set for the stored document data.

8. The image forming method according to claim 7, wherein the process efficiency is a number of times of manual processes.

9. The image forming method according to claim 7, wherein the process efficiency is a time period required for a process.

10. The image forming method according to claim 7, wherein the process efficiency is a cost required for a process.

11. A non-transitory computer-readable storage medium which stores an image forming program to store document data for which output setting data is set, the program causing a computer serving as an image forming apparatus to function to perform the steps of:

acquiring device configuration information of the image forming apparatus and device configuration information of a print post-processing apparatus which is connected to the image forming apparatus and has a paper transport path not connected to the image forming apparatus;

changing, in a case where the device configuration information acquired by said acquiring step differs from the device configuration information corresponding to when the document data was stored, the output setting data of the stored document data, in accordance with the difference of the device configuration information, by using the acquired device configuration information;

processing the document data by using the changed output setting data;

determining, by referring to the device configuration information acquired by said acquiring step after the document data is stored, whether a print post-processing apparatus not connected to the image forming apparatus is necessary for obtaining a printing result which is the same as a printing result before the document data is stored; and editing image data contained in the document data for the print post-processing apparatus not connected to the image forming apparatus in a case where said determining step determines that the print post-processing apparatus not connected to the image forming apparatus is necessary.

12. The computer-readable storage medium according to claim 11, wherein the program further causes the computer to perform the steps of:

generating new output setting data by using the device configuration information acquired by said acquiring step; and deciding output setting data having a highest process efficiency among the new output setting data generated by said generating step and the output setting data set for the stored document data.

13. The computer-readable storage medium according to claim 12, wherein the process efficiency is a number of times of manual processes.

14. The computer-readable storage medium according to claim 12, wherein the process efficiency is a time period required for a process.

15. The computer-readable storage medium according to claim 12, wherein the process efficiency is a cost required for a process.

* * * * *